United States Patent
Kondou et al.

(10) Patent No.: US 10,020,698 B2
(45) Date of Patent: Jul. 10, 2018

(54) MULTI-GAP TYPE ROTARY ELECTRIC MACHINE INCLUDING INNER AND OUTER STATORS AND A ROTOR WITH INNER AND OUTER MAGNETS

(71) Applicant: DENSO CORPORATION, Kariya, Aichi-pref. (JP)

(72) Inventors: Keiji Kondou, Nagoya (JP); Shin Kusase, Obu (JP); Takeo Maekawa, Okazaki (JP)

(73) Assignee: DENSO CORPORATION, Kariya (JP)

( * ) Notice: Subject to any disclaimer, the term of this patent is extended or adjusted under 35 U.S.C. 154(b) by 599 days.

(21) Appl. No.: 14/100,039

(22) Filed: Dec. 9, 2013

(65) Prior Publication Data
US 2014/0159532 A1 Jun. 12, 2014

(30) Foreign Application Priority Data

Dec. 7, 2012 (JP) ................................ 2012-268471
Oct. 28, 2013 (JP) ................................ 2013-223066

(51) Int. Cl.
*H02K 1/27* (2006.01)
*H02K 3/12* (2006.01)
(Continued)

(52) U.S. Cl.
CPC ............ *H02K 1/276* (2013.01); *H02K 1/27* (2013.01); *H02K 3/12* (2013.01); *H02K 16/04* (2013.01);
(Continued)

(58) Field of Classification Search
CPC .......... H02K 2213/00–2213/09; H02K 1/276; H02K 1/2706; H02K 1/27; H02K 2213/03;
(Continued)

(56) References Cited

U.S. PATENT DOCUMENTS 7,556,082 B2 * 7/2009 Welchko ................ H02K 15/03
164/95
2002/0047432 A1 4/2002 Miyashita et al.
(Continued)

FOREIGN PATENT DOCUMENTS

JP 2002-165394 6/2002
JP 2007-068357 3/2007
(Continued)

OTHER PUBLICATIONS

English Translation for JP 2010098853 from EPO.*
(Continued)

*Primary Examiner* — Bernard Rojas
*Assistant Examiner* — Maged Almawri
(74) *Attorney, Agent, or Firm* — Nixon & Vanderhye PC

(57) ABSTRACT

A multi-gap type rotary electric machine is provided, where the machine is provided a shaft supported rotatably by a baring secured to a housing. An annular rotor is secured to the shaft and configured to rotate together with the shaft. Double stators are secured to the housing and configured to have gaps between the stators and the rotor. Relationships of:

$$3.5 < P13/P6 \qquad (1)$$

and $$P7/P6 > 1 \qquad (2)$$

are met, where P6 denotes a circumferential width of each of outer salient poles, P7 denotes a circumferential width of each of inner salient poles, and P13 denotes a circumferential width of each of the outer magnets.

12 Claims, 20 Drawing Sheets

(51) Int. Cl.
*H02K 16/04* (2006.01)
*H02K 21/12* (2006.01)

(52) U.S. Cl.
CPC ......... *H02K 1/2706* (2013.01); *H02K 1/2766* (2013.01); *H02K 21/12* (2013.01); *H02K 2213/03* (2013.01)

(58) Field of Classification Search
CPC ........ H02K 16/00–16/04; H02K 21/34; H02K 1/2766; H02K 21/12
USPC ......... 310/226, 156.53, 156.56, 112, 156.01, 310/156.269, 266, 269, 114, 156.57; 10/156.01–156.58, 266, 269, 112–114
See application file for complete search history.

(56) References Cited

U.S. PATENT DOCUMENTS

| | | | |
|---|---|---|---|
| 2004/0017123 A1 | 1/2004 | Miyashita et al. | |
| 2007/0096579 A1* | 5/2007 | Aydin | H02K 1/2766 310/156.56 |
| 2008/0129135 A1* | 6/2008 | Chen | H02K 16/04 310/156.35 |
| 2010/0308680 A1 | 12/2010 | Yamada et al. | |
| 2011/0193439 A1 | 8/2011 | Yabe et al. | |
| 2011/0285238 A1* | 11/2011 | Kusase | H02K 16/04 310/156.48 |
| 2013/0093275 A1* | 4/2013 | Kim | H02K 16/04 310/114 |
| 2013/0264895 A1 | 10/2013 | Kondou et al. | |

FOREIGN PATENT DOCUMENTS

| | | | | |
|---|---|---|---|---|
| JP | 2007-261342 | | 10/2007 | |
| JP | 2008-302789 | | 12/2008 | |
| JP | 2010-098853 | | 4/2010 | |
| JP | 2010098853 | * | 4/2010 | ............ H02K 16/00 |
| JP | 2010098853 | * | 9/2010 | |
| JP | 2011-103759 | | 5/2011 | |
| JP | 2013-219950 | | 10/2013 | |
| WO | WO 2010-058609 | | 5/2010 | |
| WO | WO2011162500 | * | 12/2011 | ............ H02K 16/00 |
| WO | WO 2011162500 A2 | * | 12/2011 | ............ H02K 16/00 |

OTHER PUBLICATIONS

JP 2010098853 English Translation.*
WO_2011162500 English Translation (US 20130093275).*
Office Action (2 pgs.) dated Sep. 8, 2015 issued in corresponding Japanese Application No. 2013-223066 with an at least partial English language translation (4 pgs.).
Japanese Office Action (2 pages) dated Mar. 17, 2015, issued in corresponding Japanese Patent Application No. 2013-223066, and English translation (2 pages).

* cited by examiner

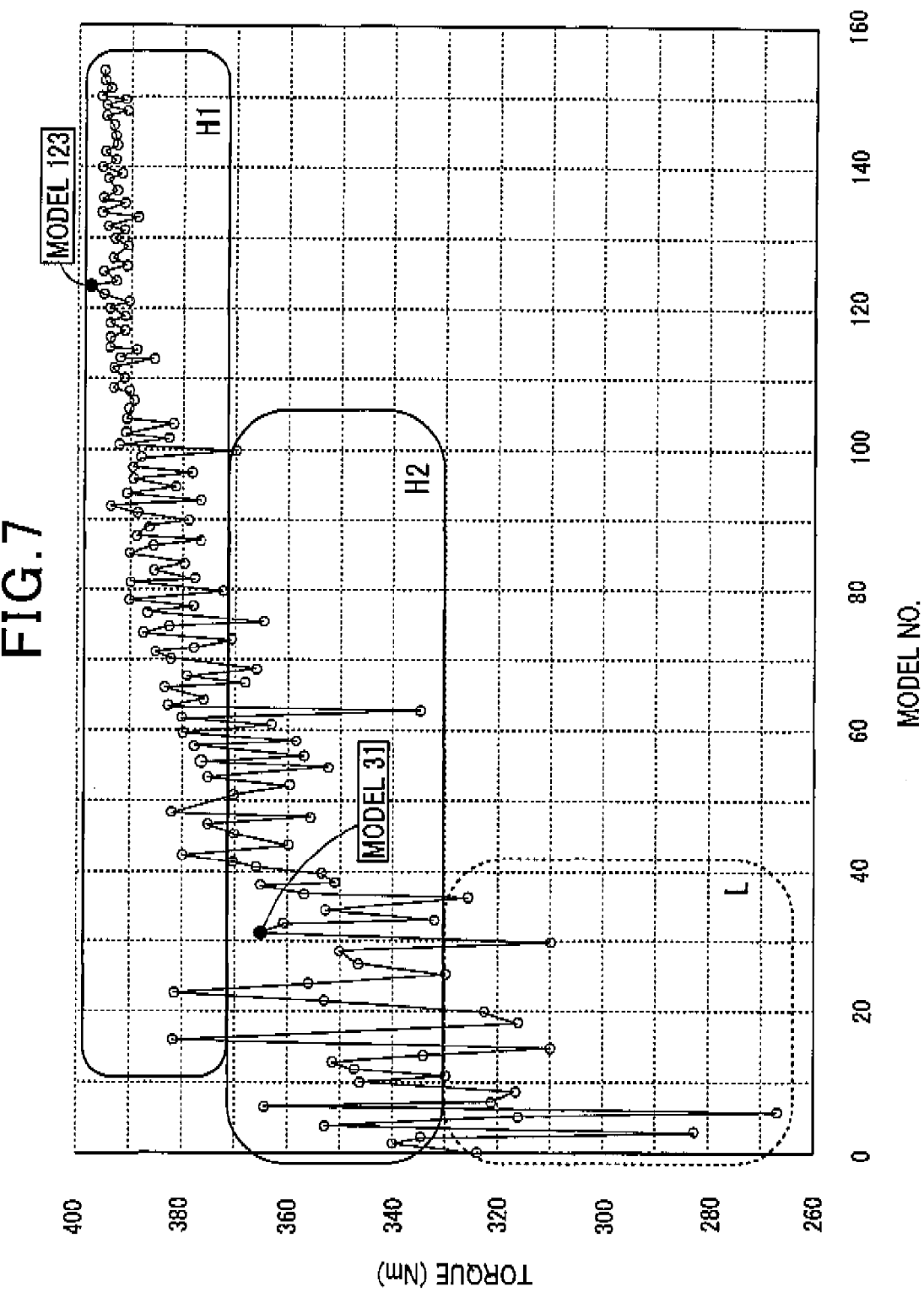

FIG.8

| TORQUE CHARACTERISTICS | SUPERIOR | | INFERIOR | TORQUE CHARACTERISTICS |
| --- | --- | --- | --- | --- |
| | GROUP H1 | GROUP H2 | GROUP L1 | |
| P1: OUTER-STATOR OUTER DIAMETER (mm) | 266 | | | — |
| P2: OUTER-STATOR INTER-SLOT DIAMETER (mm) | 249~255 | 247~257 | ~247 | |
| P3: OUTER-STATOR-TOOTH WIDTH (mm) (PER POLE) | 21.0~27.0 | 18.0~30.0 | ~18, 30~ | |
| P4: ROTOR OUTER DIAMETER (mm) | 231~235 | 228~238 | ~228 | |
| P5: OUTER-MAGNET THICKNESS (mm) | 3.0~5.0 | 3.0~5.5 | ~3.0 | |
| P6: OUTER-SALIENT-POLE WIDTH (mm) | 3.0~9.0 | 2.0~10.0 | 10.0~ | |
| P7: INNER-SALIENT-POLE WIDTH (mm) | 8.5~13.0 | 7.0~13.0 | ~7.0 | |
| P8: INNER-MAGNET THICKNESS (mm) | 2.5~4.5 | 1.5~4.5 | 4.5~ | |
| P9: ROTOR INNER DIAMETER (mm) | 183~193 | 186~193 | 193~ | |
| P10: INNER-STATOR INTER-SLOT DIAMETER (mm) | 164~169 | 163~169 | 169~ | |
| P11: INNER-STATOR-TOOTH WIDTH (mm) (PER POLE) | 10.5~19.5 | 13.5~19.5 | 19.5~ | |
| P12: INNER-STATOR INNER DIAMETER (mm) | 152~156 | 150~158 | 158~ | |
| P13: OUTER-MAGNET WIDTH (mm) (PER POLE) | 35~42 | 34~43 | ~34 | |

RELATIVE DIMENSIONAL RANGES

FIG.9

MODEL 31

| P1: OUTER-STATOR OUTER DIAMETER (mm) | 266 |
|---|---|
| P2: OUTER-STATOR INTER-SLOT DIAMETER (mm) | 252 |
| P3: OUTER-STATOR-TOOTH WIDTH (mm) (PER POLE) | 25.8 |
| P4: ROTOR OUTER DIAMETER (mm) | 231.3 |
| P5: OUTER-MAGNET THICKNESS (mm) | 4.0 |
| P6: OUTER-SALIENT-POLE WIDTH (mm) | 6.0 |
| P7: INNER-SALIENT-POLE WIDTH (mm) | 8.0 |
| P8: INNER-MAGNET THICKNESS (mm) | 4.2 |
| P9: ROTOR INNER DIAMETER (mm) | 191.8 |
| P10: INNER-STATOR INTER-SLOT DIAMETER (mm) | 166.5 |
| P11: INNER-STATOR-TOOTH WIDTH (mm) (PER POLE) | 17.82 |
| P12: INNER-STATOR INNER DIAMETER (mm) | 154 |
| P13: OUTER-MAGNET WIDTH (mm) (PER POLE) | 38.6 |

FIG.10

MODEL 123

| | |
|---|---|
| P1: OUTER-STATOR OUTER DIAMETER (mm) | 266 |
| P2: OUTER-STATOR INTER-SLOT DIAMETER (mm) | 254 |
| P3: OUTER-STATOR-TOOTH WIDTH (mm) (PER POLE) | 24.66 |
| P4: ROTOR OUTER DIAMETER (mm) | 234.54 |
| P5: OUTER-MAGNET THICKNESS (mm) | 3.6 |
| P6: OUTER-SALIENT-POLE WIDTH (mm) | 4.0 |
| P7: INNER-SALIENT-POLE WIDTH (mm) | 12.0 |
| P8: INNER-MAGNET THICKNESS (mm) | 3.4 |
| P9: ROTOR INNER DIAMETER (mm) | 189.1 |
| P10: INNER-STATOR INTER-SLOT DIAMETER (mm) | 167.3 |
| P11: INNER-STATOR-TOOTH WIDTH (mm) (PER POLE) | 14.52 |
| P12: INNER-STATOR INNER DIAMETER (mm) | 154 |
| P13: OUTER-MAGNET WIDTH (mm) (PER POLE) | 41.4 |

(q-AXIS MAGNETIC FLUX)

(d-AXIS MAGNETIC FLUX)

MULTI-GAP TYPE ROTARY ELECTRIC MACHINE INCLUDING INNER AND OUTER STATORS AND A ROTOR WITH INNER AND OUTER MAGNETS

CROSS-REFERENCE TO RELATED APPLICATION

This application is based on and claims the benefit of priorities from earlier Japanese Patent Application Nos. 2012-268471 and 2013-223066 filed Dec. 7, 2012 and Oct. 28, 2013, respectively, the descriptions of which are incorporated herein by reference.

BACKGROUND OF THE INVENTION

Technical Field of the Invention

The present invention relates to a multi-gap type rotary electric machine which is applicable to various uses, such as industrial uses and vehicle uses and in particular is preferred to be used in a drive motor for hybrid vehicles.

Related Art

As small and high-power motors based on conventional art, IPM motors (Interior permanent magnet motors) are well known. The IPM motors can use reluctance torque that is a core attractive force, in addition to magnet torque that is generated by magnets. The IPM motors include double-stator motors in which stators are arranged in radially inside and radially outside of the rotor.

For example, a patent document JP-A-2008-302789 discloses a double-stator motor. In this double-stator motor, permanent magnets are embedded in the rotor so as to be located radially inward thereof, being opposed to the inner stator, and also embedded in the rotor so as to be located radially outward thereof, being opposed to the outer stator. The rotor also has salient poles (rotor core portions) each of which is formed between circumferentially adjacent magnets.

However, the motor disclosed in the patent document JP-A-2008-302789 suffers from a problem of not being able to increase power density for the reasons set forth below.

a) The stator winding is a short-pitch winding. Therefore, the pole pitch of the rotor does not coincide with the pole pitch of the magnetic field generated by the stator windings. Therefore, the reluctance torque cannot be fully used.

b) The surface of each of the salient poles of the rotor is concaved. Specifically, the inner peripheral surface of each of the inner salient poles and the outer peripheral surface of each of the outer salient poles of the rotor are concaved. Therefore, magnetic resistance is increased and the reluctance torque cannot be fully used.

c) The outer magnetic circuit is ensured to have a high rate of the reluctance torque by increasing the outer-salient-pole width relative to one pole pitch of the rotor. However, this increases the length of the magnetic path and accordingly increases the magnetic resistance, resulting in decreasing the reluctance torque. Further, since the increase of the salient-pole width necessarily decrease the magnet width, the magnet torque cannot be fully used as well.

d) Further, due to the increase of the outer-salient-pole width of the rotor, the rotor yoke, in which the magnetic path is shared between the outer and inner magnetic circuits, is unavoidably saturated with the magnetic flux supplied from the outer salient poles to the rotor. As a result, torque is decreased in the inner magnetic circuit as well which is preferred to have a short magnetic path compared to the outer magnetic circuit and to increase the rate of the reluctance torque.

Meanwhile as small and high-power motors based on conventional art, IPM motors (interior permanent magnet motors) are well known. The IPM motors can use reluctance torque that is a core attractive force, in addition to magnet torque that is generated by magnets. The IPM motors include double-stator motors. As shown in FIG. 19, in such a double-stator motor, an inner stator 110 and an outer stator 120 are arranged in radially inside and outside of a rotor 100.

For example, a patent document JP-A-2007-261342 discloses a double-stator motor. In this double-stator motor, a rotor core 101 facing the inner stator 110 has an inner periphery in which inner magnets 130 are embedded and an outer periphery in which outer magnets 140 are embedded. Thus, in the rotor core 101, inner salient poles 102 and outer salient poles 103 are formed, each being interposed between circumferentially adjacent magnetic poles.

However, the motor disclosed in the patent document JP-A-2007-261342 suffers from problems as set forth below, which should be solved before the motor is put into practical use.

a) Local demagnetization is likely to be caused in the permanent magnets (inner magnets 130 and outer magnets 140) embedded in the rotor core 101, in particular, in end portions of each magnetic pole (both circumferential end portions).

b) In the double-stator motor in which the inner and outer stators 110 and 120 are arranged radially inside and outside of the rotor 100, the inner magnets 130 are more likely to be demagnetized compare to the outer magnets 140.

As a result of studying the problems set forth above, the inventors of the present invention found the following fundamental causes.

The biggest cause of the above item a) lies in that: magnetic saturation tends to occur in the rotor yoke in which magnetic flux of an inner magnetic circuit and magnetic flux of an outer magnetic circuit join together and flow therethrough and; the magnetic saturation causes magnetic leakage toward the inside of the magnets, resulting in applying a large demagnetizing field to the magnets.

The reason why magnetic saturation tends to occur is that the rotor yoke has a width W which is narrow in the vicinities of the end portions of each magnetic pole, and the end portions have a highest concentration of q-axis magnetic flux (see FIG. 20) that generates reluctance torque and d-axis magnetic flux (see FIG. 21) that generates magnet torque, as indicated by the thick arrows in FIG. 19.

Another cause of bringing local demagnetization is that the tendency of causing magnetic saturation in the salient poles 102 and 103 provided in between the magnetic poles leads to the occurrence of magnetic leakage, resultantly applying a large demagnetizing field to the end portions of each magnetic pole, which are near the salient poles. The reason why magnetic saturation tends to occur is that, as shown in FIG. 20, the q-axis magnetic flux is concentrated on the salient poles 102 and 103, in which the interval between the magnetic poles is small.

The cause of the above item b) lies in that: In a double-stator motor, magnetic saturation tends to occur in the inner magnetic circuit compared to the outer magnetic circuit and; the magnetic saturation causes magnetic leakage, resulting in applying a large demagnetizing field to the vicinities of the inner magnets 130. The reason why magnetic saturation tends to occur is that the inner stator 110 arranged radially inside of the rotor 100 has a space occupancy which is smaller than that of the outer stator 120 arranged radially outside of the rotor 100. Specifically, if slot dimensions equivalent to those of the outer stator 120 are attempted to be ensured in the inner stator 110, the inner stator 110 has to have a small tooth width. The cause of demagnetization in magnets, to begin with, is that the demagnetizing field is large with respect to the retentive power of the magnets (retentive power is proportionate to the thickness of each magnet). Accordingly, an effective measure against demagnetization of magnets is to increase the thickness of each magnet. However, in a double-stator motor, the increase in the thickness of each magnet leads to the decrease in the thickness of the rotor yoke or the back yoke of either of the inner and outer stators. As a result, magnetic saturation is caused and the motor performance is impaired.

SUMMARY

Hence it is desired to provide a multi-gap type rotary electric machine which is able to increase the rate of the magnet torque in the outer magnetic circuit and enhance the output torque by providing a configuration in which the reluctance torque is fully used in the inner magnetic circuit.

There is provided a multi-gap type rotary electric machine which is able to, as another object, prevent demagnetization of magnets, in end portions of each rotor pole, without impairing the performance of the machine and to, as another object, more enhance resistance to demagnetization in the inner magnets than in the outer magnets.

An exemplary embodiment provides a multi-gap type rotary electric machine, comprising: a shaft supported rotatably by a baring secured to a housing; an annular rotor secured to the shaft and configured to rotate together with the shaft; and a stator secured to the housing and configured to have a gap between the stator and the rotor.

The rotor includes an annular rotor core made of soft magnetic material and configured to have a radial direction and a circumferential direction, a plurality of inner magnets, each composed of a permanent magnet, embedded in radially inner portions of the rotor core at equal pitches in the circumferential direction, and a plurality of outer magnets, each composed of a permanent magnet, embedded in radially outer portions of the rotor core at equal pitches in the circumferential direction.

The rotor core includes a plurality of inner salient poles each formed between mutually adjacent two of the inner magnets in the circumferential direction, and a plurality of outer salient poles each formed between mutually adjacent two of the outer magnets in the circumferential direction, the inner and outer salient poles being made of soft magnetic material.

The stator includes at least an inner stator located on a radially inner side of the rotor with a gap left between the inner stator and the rotor, and an outer stator located on a radially outer side of the rotor with a gap left between the outer stator and the rotor.

The inner stator includes an inner stator core provided with a plurality of inner slots formed on an radially outer circumference of the inner stator at equal intervals in the circumference direction and a plurality of inner teeth formed on the radially outer circumference at equal intervals in the circumferential direction, the inner slots and the inner teeth being aligned alternately in the circumferential direction; and an inner stator winding full-pitch wound at the inner stator core through the inner slots.

The outer stator includes an outer stator core provided with a plurality of outer slots formed on an radially inner circumference of the outer stator at equal intervals in the circumference direction and a plurality of outer teeth formed on the radially inner circumference at equal intervals in the circumferential direction, the outer slots and the outer teeth being aligned alternately in the circumferential direction; and an outer stator winding full-pitch wound at the outer stator core through the outer slots.

In the foregoing construction, relationships of:

$$3.5 < P13/P6 \quad (1) \text{ and}$$

$$P7/P6 > 1 \quad (2)$$

are met, where P6 denotes a circumferential width of each of the outer salient poles, P7 denotes a circumferential width of each of the inner salient poles, and P13 denotes a circumferential width of each of the outer magnets.

In the multi-gap type rotary electric machine, the inner magnets are embedded in the rotor core so as to be located radially inward thereof and the outer magnets are embedded in the rotor core so as to be located radially outward thereof to provide inner salient poles each of which is located between circumferentially adjacent inner magnets, and outer salient poles each of which is located between circumferentially adjacent outer magnets. Thus, both of the magnet torque and the reluctance torque are put to practical use. Also, the inner and outer stators are applied with full-pitch winding of the inner and outer stator windings, respectively. Specifically, the pole pith of the rotor is equal to the pole pitch of the magnetic field generated by the inner and outer stator windings. Accordingly, the reluctance torque can be fully used.

Further, with the requirements of Formulas (1) and (2) being met, appropriate relationship can be established between P13 (outer-magnet width), P6 (outer-salient-pole width) and P7 (inner-salient-pole width). Accordingly, the rate of the magnet torque is increased in the outer magnetic circuit. In addition, the rotor yoke, in which the magnetic path is shared between the outer and inner magnetic circuits, is prevented from being magnetically saturated. Thus, the reluctance torque can be fully used in the inner magnetic circuit as well.

In this way, the multi-gap type rotary electric machine can enhance the output torque, reduce the size and increase the power.

Another exemplary embodiment provides a multi-gap type rotary electric machine, comprising: a shaft having a length-wise direction defined as an axial direction, the shaft given both a radial direction and a circumferential direction defined in relation to the axial direction; an annular rotor securely arranged on the shaft such that the rotor and the shaft rotate together on a center axis of the shaft, the rotor and shaft being concentric to each other; an inner stator arranged radially inside the rotor with a gap left between the inner stator and the rotor; and an outer stator arranged radially outside the rotor with a gap left between the outer stator and the rotor; wherein the rotor includes an annular rotor core made of soft magnetic material, inner magnets arranged at radially inner positions in the rotor core, which positions are closer to a radially inner periphery of the rotor core, the inner magnets providing a plurality of inner rotor poles, and outer magnets arranged at radially outer positions in the rotor core, which positions are closer to a radially outer periphery of the rotor core, the outer magnets providing a plurality of outer rotor poles, wherein the rotor core includes a plurality of inner salient poles each located between mutually adjacent two of the inner rotor poles in the circumferential direction and a plurality of outer salient poles each located between mutually adjacent two of the outer rotor poles in the circumferential direction, wherein each of the inner and outer rotor poles has two end portions in the circumferential direction, each of the inner and outer inner magnets has a thickness in the radial direction, each of the inner magnets has a radially outer circumferential surface and each of the outer magnets has a radially inner circumferential surface, and the radially inner/outer circumferential surfaces of the end portions of at least ones of the inner and outer magnets have inclinations which gradually reduces the thickness as advancing toward an end of each of the magnet in the circumferential direction.

In the multi-gap type rotary electric machine, the opposite-to-stator surface of either or both of the inner and outer magnets is inclined to gradually reduce the thickness of the magnet in the magnetic pole ends, toward the circumferential ends of the magnet with reference to the circumferentially center portion of the magnet. In other words, the radial width of the rotor yoke, in which a magnetic path common to the inner and outer rotor poles is created, is gradually increased (widened) toward the circumferential ends of each inner or outer rotor pole, with reference to the pole center portion. Thus, in the rotor yoke, magnetic saturation is minimized in the vicinities of the pole end portions. As a result, the occurrence of local demagnetization is prevented in the pole end portions of the magnets.

BRIEF DESCRIPTION OF THE DRAWINGS

In the accompanying drawings:

FIG. 7 is a graph showing the results of calculations of torque generated by models, according to the second embodiment;

FIG. 8 is a table listing the ranges of dimensions at portions of the magnetic circuits of motors;

FIG. 9 is a table listing the design specification of the model 31 shown in FIG. 7;

FIG. 10 is a table listing the design specification of the model 123 shown in FIG. 7;

FIG. 3 is a cross-sectional view illustrating ¼ of a magnetic circuit of a motor in a circumferential direction, according to the fourth embodiment;

DETAILED DESCRIPTION OF THE PREFERRED EMBODIMENTS

With reference to the accompanying drawings, hereinafter are described several embodiments of the present invention.

First Embodiment

Referring, first, to FIGS. 1 to 5, hereinafter is described a first embodiment of the present invention.

In the first embodiment, the multi-gap type rotary electric machine of the present invention is applied to a drive motor 1 which is installed in a vehicle or the like.

Figure 1:
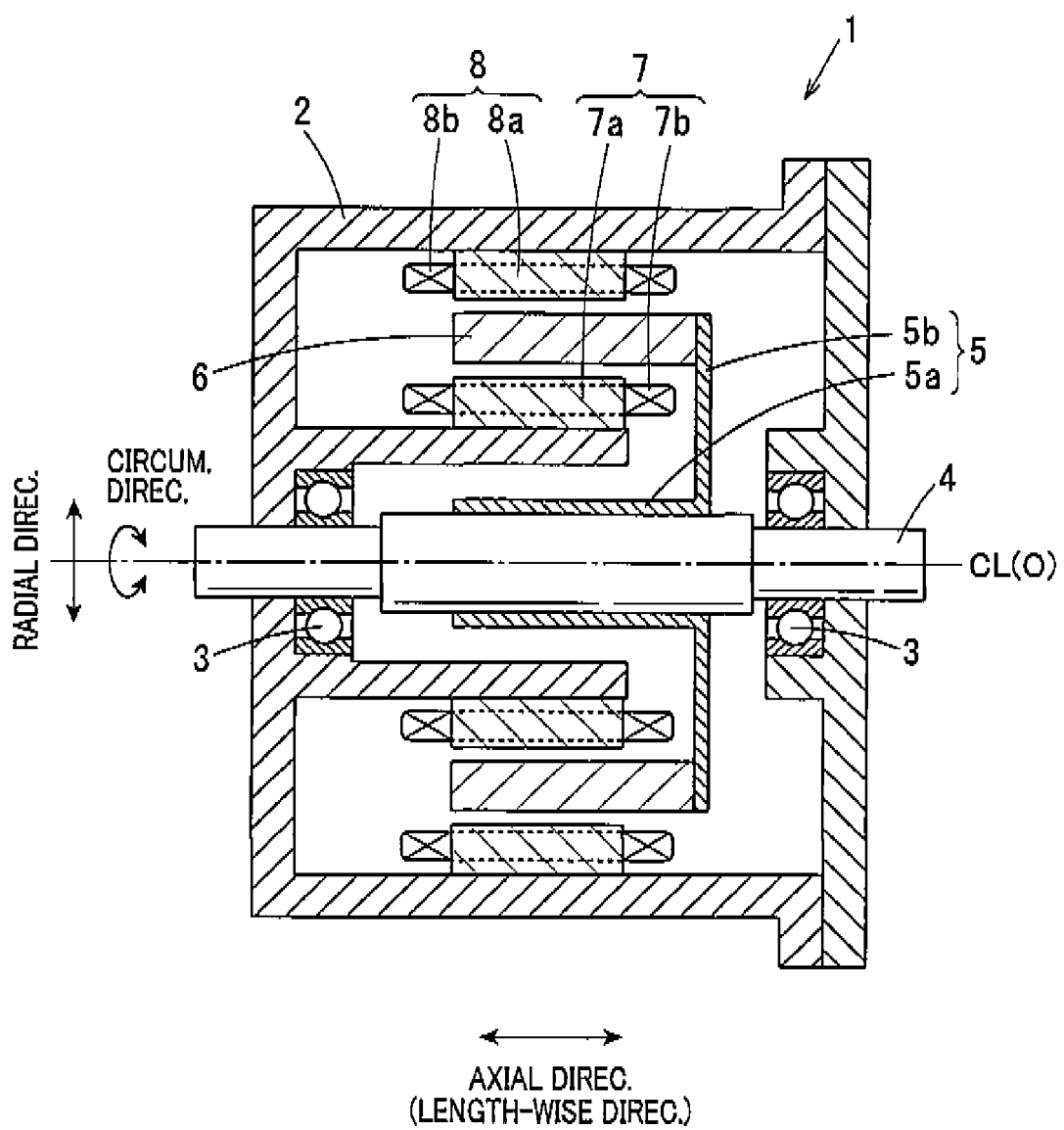
FIG. 1 is a vertical cross-sectional view illustrating a configuration of a motor, according to a first embodiment of the present invention.

FIG. 1 is a vertical cross-sectional view illustrating a configuration of the motor 1. As shown in FIG. 1, the motor 1 of the first embodiment includes a motor housing 2, a shaft 4, a rotor 6, an inner stator 7, and an outer stator 8. The shaft 4 is rotatably supported by the motor housing 2 via a baring 3. The rotor 6 is in an annular shape and supported by the shaft 4 via a rotor retaining member 5. The inner stator 7 is arranged radially inside of the rotor 6. The outer stator 8 is arranged radially outside of the rotor 6.

The shaft 4 is configured to rotate on a length-wise central axis CL passing through a center O in a circular section of the shaft 4, which section is orthogonal to the length-wise section. Hence, the rotor 6, the inner stator 7, and the outer stator 8 are mutually coaxially arranged to the central axis CL.

For example, the rotor retaining member 5 is formed of a non-magnetic SUS material and includes a cylindrical portion 5a and a rotor disc 5b. The cylindrical portion 5a is fitted and fixed to the outer periphery of the shaft 4. The rotor disc 5b is in a disc-like shape and extended radially outward from an end of the cylindrical portion 5a. The rotor 6 is fixed to the rotor disc 5b.

Figure 2:
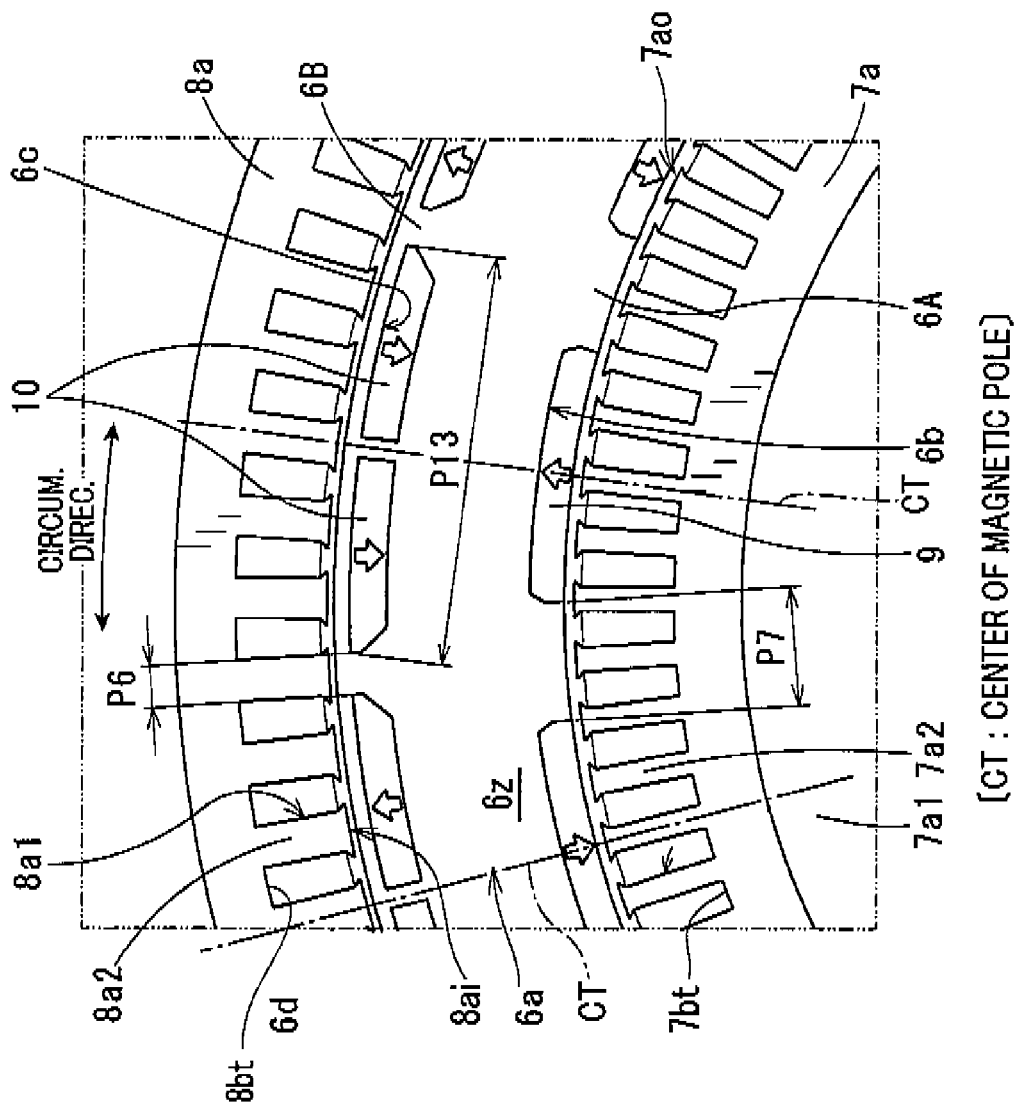
FIG. 2 is a cross-sectional view illustrating the magnetic circuits of the motor.

As shown in FIG. 2, the rotor 6 includes a rotor core 6a including a rotor yoke 6z, permanent magnets 9 (hereinafter referred to as inner magnets 9), and permanent magnets 10 (hereinafter referred to as outer magnets 10). The inner magnets 9 are embedded in the rotor core 6a so as to be located radially inward thereof and the outer magnets 10 are embedded in the rotor core 6a so as to be located radially outward thereof.

For example, the rotor core 6a is configured by stacking a plurality of core sheets each of which is formed by annularly pressing and punching an electromagnetic steel plate. The rotor core 6a has a radially inner peripheral portion which is provided with inner magnet insertion grooves 6*b* and inner salient poles 6A. The rotor so core 6*a* also has a radially outer peripheral portion which is provided with outer magnet insertion holes 6*c* and outer salient poles 6B.

The inner magnet insertion grooves 6*b* and the outer magnet insertion holes 6*c* are each formed throughout the rotor core 6*a* in the direction of stacking the core sheets so as to have a predetermined opening width in the circumferential direction of the rotor core 6*a*. Also, the inner magnet insertion grooves 6*b* and the outer magnet insertion holes 6*c* are formed in the circumferential direction of the rotor core 6*a* at predetermined intervals, by the number equal to that of the poles of the rotor 6. Each of the inner magnet insertion grooves 6*b* is formed in a groove shape, with the inner peripheral side of the rotor core 6*a* being open. Each of the outer magnet insertion holes 6*c* is formed in a hole shape, with the outer peripheral side of the rotor core 6*a* being closed.

Each of the inner salient poles 6A is formed between circumferentially adjacent inner magnet insertion grooves 6*b*. Each of the outer salient poles 6B is formed between circumferentially adjacent outer magnet insertion holes 6*c*. The circumferential positions of the inner salient poles 6A in the rotor core 6*a* are ensured to coincide with those of the respective outer salient poles 6B. Each inner salient pole 6A has an inner peripheral surface which is ensured to be concyclic with the inner-radius surface of the rotor 6. Also, each outer salient pole 6B has an outer peripheral surface which is ensured to be concyclic with the outer-radius surface of the rotor 6.

The inner magnets 9 are inserted into the respective inner magnet insertion grooves 6*b* formed in the rotor core 6*a*, for arrangement at an even pitch in the circumferential direction.

The outer magnets 10 are inserted into the respective outer magnet insertion holes 6*c* formed in the rotor core 6*a*, for arrangement at an even pitch in the circumferential direction.

As shown by the hollow arrows in FIG. 2, the inner and outer magnets 9 and 10 are magnetized in the radial direction of the rotor 6. As can be seen, the direction of the polarity is different from each other between the circumferentially adjacent magnets. Also, the direction of the polarity is opposite to each other between the radially facing inner magnet 9 and outer magnet 10.

In the rotor 6*a* shown in FIG. 2, each outer magnet insertion hole 6*c* for inserting the outer magnet 10 has a circumferentially center portion at which the hole 6*c* is divided into two and a bridge 6*d* is formed to connect the inner peripheral side and the outer peripheral side of the outer magnet insertion hole 6*c*. The bridge 6*d* is provided for the purpose of preventing radially outward expansion of the radially outer portion of the rotor core 6*a*, which covers the outer peripheral surfaces of the outer magnets 10, when pressed radially outward due to the effect of the centrifugal force. Thus, the magnet insertion hole 6*c*, which is divided into two in FIG. 2, may be divided into three or more. However, the outer magnet insertion hole 6*c* does not have to be necessarily divided, unless the radially outer portion of the rotor core 6*a* comes into contact with the outer stator 8, or, in other words, as far as the deformation in the radially outer portion of the rotor core 6*a* is so small that the effect of the centrifugal force is ignorable.

In the rotor 6 shown in FIG. 2, the outer magnets 10 are inserted into and embedded in the respective outer magnet holes 6*c* to establish what is generally called a magnet-embedded structure. On the other hand, the inner magnets 9 are inserted into the respective inner magnet insertion grooves 6*b* with the radially inner peripheral surfaces of the magnets being exposed to establish a so-called inset structure. The expression "embedded" encompasses the term "inset". In other words, the multi-gap type rotary electric machine of the present disclosure is not limited to the magnet-embedded structure in which the permanent magnets are enclosed by the rotor core 6*a*, but may be applied to the inset structure in which the permanent magnets are embedded in the rotor core 6*a* with the magnets' surfaces (radially inner or outer peripheral surfaces) being exposed. In short, the "magnet-embedded structure" here is defined to encompass the "inset structure".

As shown in FIGS. 1 and 2, the inner stator 7 includes an inner stator core 7*a* with a radially outer circumference 7*ao* (see FIG. 2) and inner stator windings 7*b* of three phases (U, V and W) (see FIG. 1). On the radially outer circumference 7*ao* of the inner stator core 7*a*, a plurality of inner slots 7*a*1 are formed at regular intervals in the circumferential direction with an inner tooth 7*a*2 being formed in between the circumferentially adjacent inner slots 7*a*1. Each inner slot 7*a*1 has a bottom 7*bt*, as shown in FIG. 2. Full-pitch winding of the inner stator windings 7*b* is applied to the inner stator core 7*a*.

As shown in FIGS. 1 and 2, the outer stator 8 includes an outer stator core 8*a* with a radially inner circumference 8*a*1 (see FIG. 2) and outer stator windings 8*b* of three phases (X, Y and Z) (see FIG. 1). On the radially outer circumference 8*ai* of the outer stator core 8*a*, a plurality of outer slots 8*a*1 are formed at regular intervals in the circumferential direction with an outer tooth 8*a*2 being formed in between the circumferentially adjacent outer slots 8*a*1. Each outer slot 8*a*1 has a bottom 8*bt*, as shown in FIG. 2. Full-pitch winding of the outer stator windings 8*b* is applied to the outer stator core 8*a*.

The number of slots is the same between the inner and outer stators 7 and 8.

Figure 3:
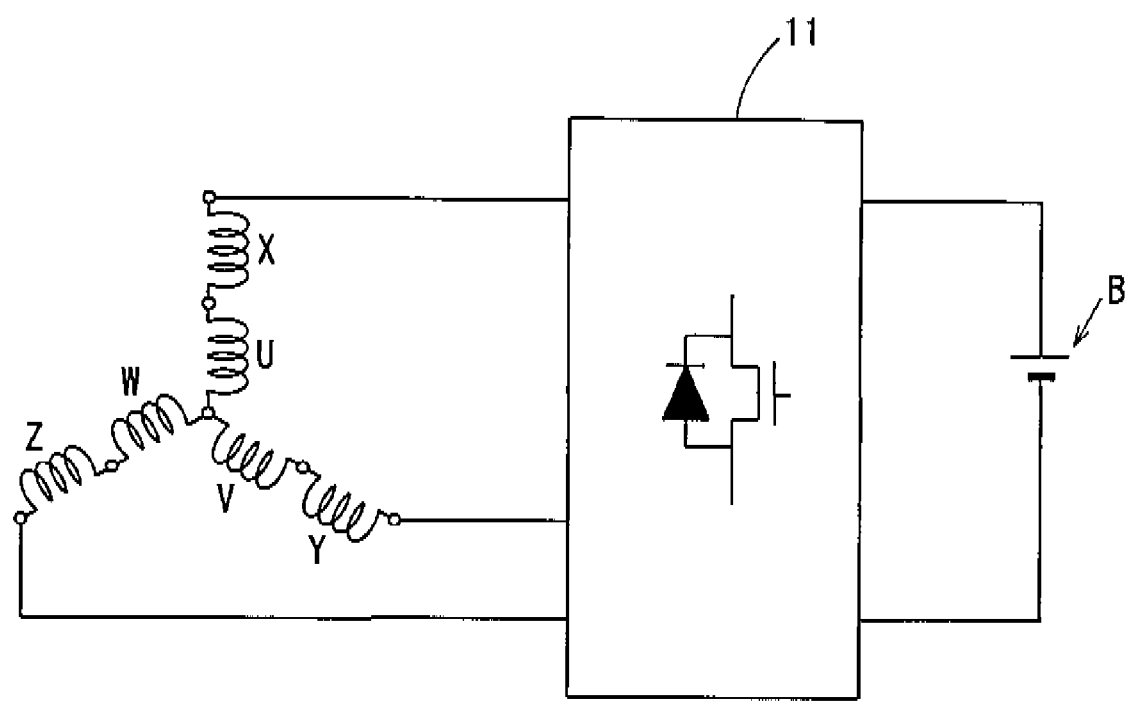
FIG. 3 is a connection diagram illustrating a state where inner and outer stator windings are connected to an inverter.

FIG. 3 is a connection diagram illustrating a state where the inner and outer stator windings 7*b* and 8*b* are connected to an inverter 11. For example, as shown in FIG. 3, the U-, V- and W-phase inner stator windings 7*b* are serially connected to the X-, Y- and Z-phase outer stator windings 8*b*, respectively, to establish a star connection which is connected to the inverter 11. The inverter 11 is controlled by an ECU (electronic control unit), not shown. The control performed by the ECU is based on information derived from a rotor position sensor, not shown, which senses the rotational position of the rotor 6. The inverter 11 converts the electric power of a direct-current power source B into alternating-current electric power and supplies the converted electric power to the inner and outer stator windings 7*b* and 8*b*.

When the inner and outer stator windings 7*b* and 8*b* are excited via the inverter 11, the inner and outer stators 7 and 8 each generate winding magnetomotive force in such a way that the same polarity is created in the magnetic poles that are radially opposed to each other via the rotor 6 at the same circumferential position.

Hereinafter is described a design specification related to the magnetic circuits of the rotor 6.

First, portions of the magnetic circuits shown in FIG. 2 are defined as follows.

The circumferential width of each outer salient pole 6B is referred to as outer-salient-pole width and denoted as P6.

The circumferential width of each inner salient pole 6A is referred to as inner-salient-pole width and denoted as P7.

The circumferential width of each outer magnet 10 is referred to as outer-magnet width and denoted as P13.

The following Formula (1) is applied to the relationship between P6 and P13, while Formula (2) is applied to the relationship between P6 and P7.

$$3.5 < P13/P6 \tag{1}$$

$$P7/P6 > 1 \tag{2}$$

Advantageous Effects of the First Embodiment

The motor 1 of the first embodiment uses the magnet-embedded rotor 6 in which the inner magnets 9 are embedded in the rotor core 6a so as to be located radially inward thereof and the outer magnets 10 are embedded in the rotor core 6a so as to be located radially outward thereof. Therefore, both of the magnet torque and the reluctance torque are put to practical use.

Further, full-pitch winding of the inner stator windings 7b and the outer stator windings 8b are applied to the inner stator 7 and the outer stator 8, respectively. Specifically, the pole pitch of the rotor 6 is equal to the pole pitch of the magnetic field generated by the inner and outer stator windings 7b and 8b. Therefore, the reluctance torque can be fully used.

Further, in the inner salient poles 6A and the outer salient poles 6B formed in the rotor core 6a, the inner peripheral surface of each inner salient pole 6A is ensured to be concyclic with the inner-radius surface of the rotor 6, and the outer peripheral surface of each outer salient pole 6B is ensured to be concyclic with the outer-radius surface of the rotor 6. In other words, since the inner peripheral surface of each inner salient pole 6A and the outer peripheral surface of each outer salient pole 6B are not concaved, magnetic resistance will not be increased as in the double-stator motor disclosed in the patent document JP-A-2008-302789. Accordingly, the reluctance torque can be effectively used.

With the application of Formulas (1) and (2) set forth above to the magnetic circuits of the rotor 6, an appropriate relationship can be established between P13 (outer-magnet width), P6 (outer-salient-pole width) and P7 (inner-salient-pole width). Thus, the rate of the magnet torque can be increased in the outer magnetic circuit. Also, since the magnetic saturation is minimized in the rotor yoke 6z, the reluctance torque can be fully used in the inner magnetic circuit as well.

The outer magnetic circuit refers to a magnetic circuit in which magnetic flux passes between the outer stator 8 and the rotor 6. The inner magnetic circuit refers to a magnetic circuit in which magnetic flux passes between the inner stator 7 and the rotor 6. The rotor yoke 6z refers to a portion of the rotor core 6a, in which the magnetic path is shared between the outer and inner magnetic circuits.

Figure 4:
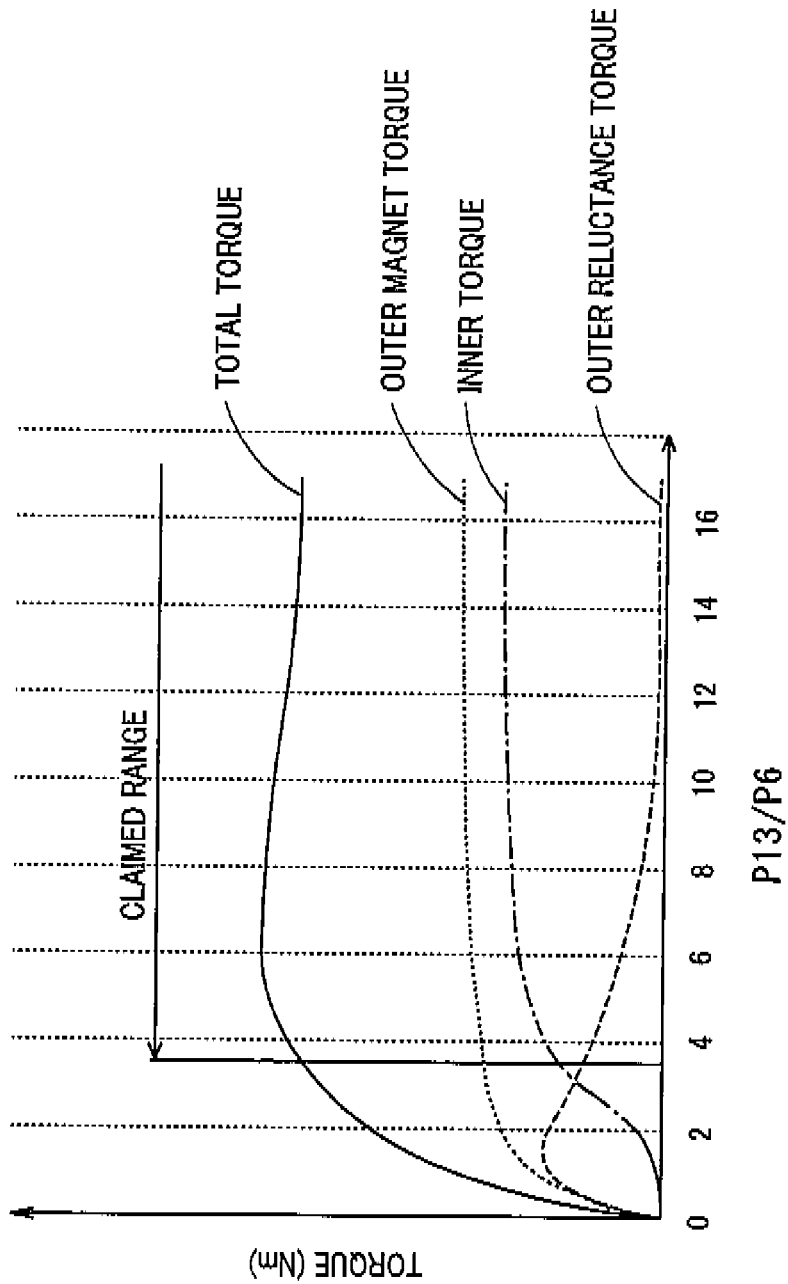
FIG. 4 shows the range of P13/P6 relative to torque, resulting from simulations.

The requirements of Formulas (1) and (2) set forth above are derived as a result of simulations using models on a computer. The results of the simulations are shown in FIGS. 4 and 5.

The models of the simulations meet the requirements of both of Formulas (1) and (2). Specifically, with the requirements of Formula (2) being met, when an output torque is calculated using P13/P6 as a parameter, total output torque is enhanced, as shown in FIG. 4, in the range of Formula (1). More specifically, the magnet torque in the outer magnetic circuit becomes high, and the inner torque also becomes high in the inner magnetic circuit, the inner torque being the sum of the magnet torque and the reluctance torque.

Figure 5:
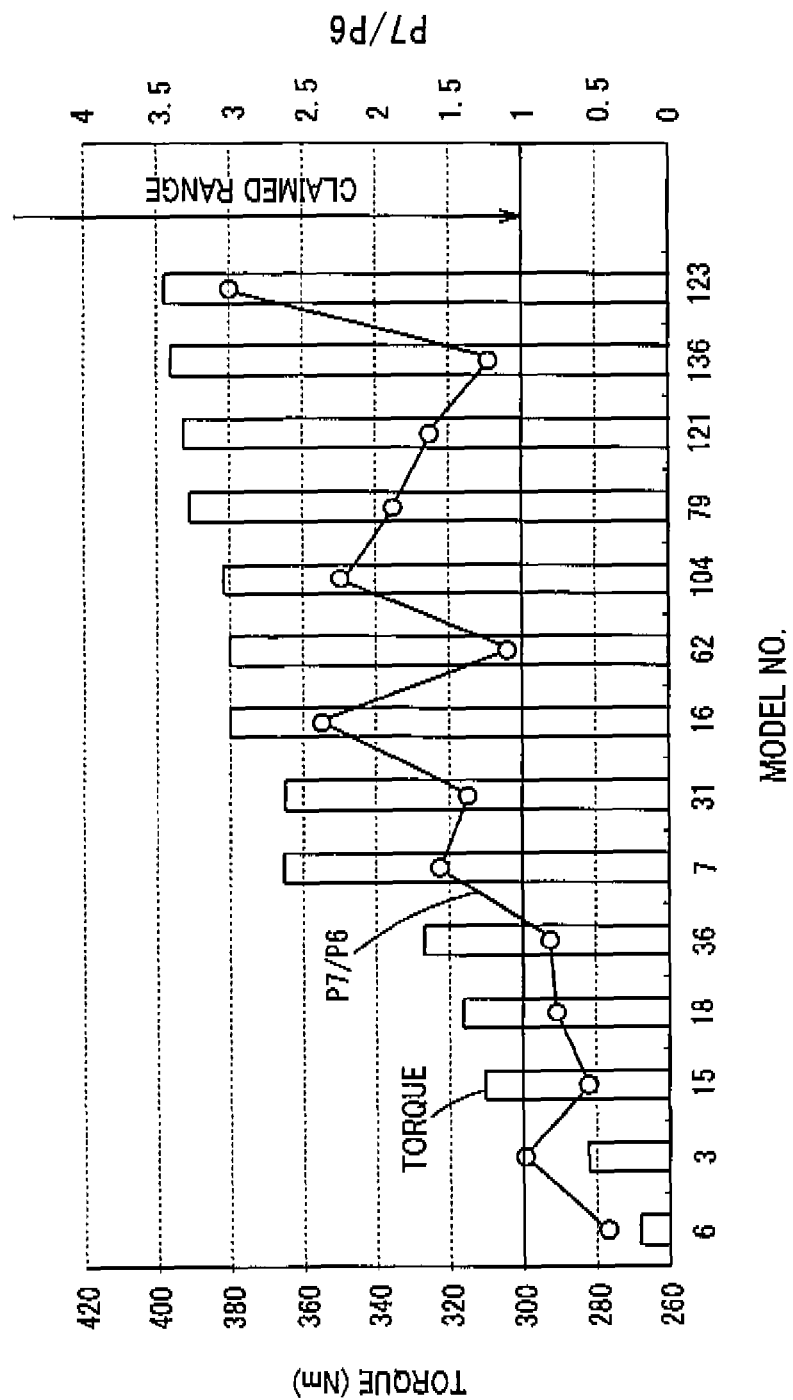
FIG. 5 shows the range of P7/P6 relative to torque, resulting from simulations.

Similarly, with the requirements of Formula (1) being met, when an output torque is calculated using P7/P6 as a parameter, total output torque is enhanced, as can be seen from FIG. 5, in the range of P7/P6>1 that meets the requirements of Formula (2).

The simulations reveal that, when the requirements of Formulas (1) and (2) are met, the output torque of the motor as a whole is enhanced and therefore a small-size and high-power motor can be realized.

Other Embodiments

Referring to FIGS. 6 to 11, hereinafter are described second and third embodiments related to the present invention.

In the second and third embodiments, the components identical with or similar to those in the first embodiment are given the same reference numerals for the sake of omitting unnecessary explanation.

Second Embodiment

In the second embodiment, dimensional ranges at portions related to the magnetic circuits of the motor 1 are set, on condition that the requirements of Formulas (1) and (2) of the first embodiment are met.

Figure 6:
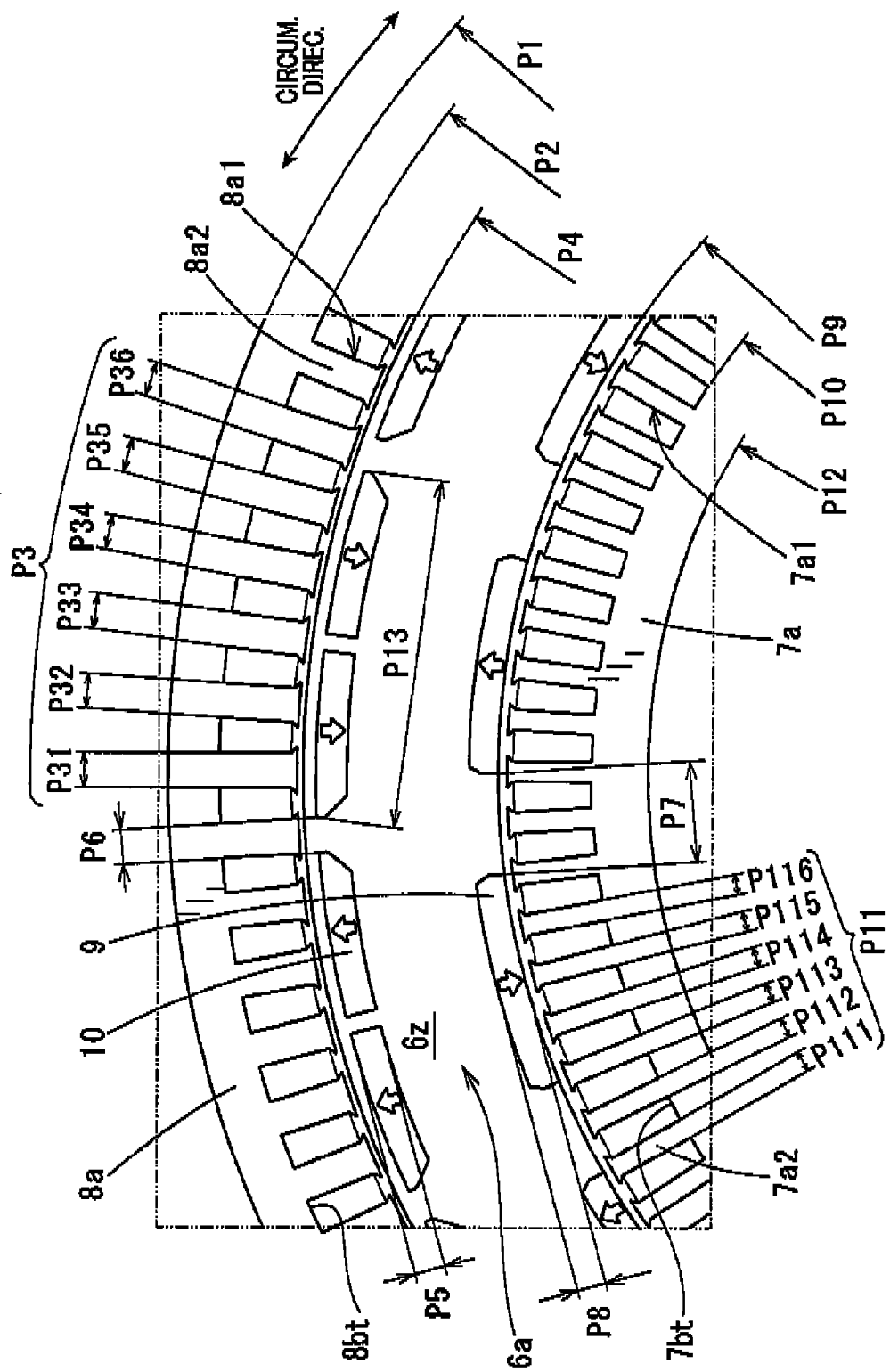
FIG. 6 is a cross-sectional view illustrating the magnetic circuits of a motor, according to a second embodiment of the present invention.

FIG. 6 is a cross-sectional view illustrating the magnetic circuits of the motor 1 according to the third embodiment. Portions in the magnetic circuits shown in FIG. 6 are denoted as P1 to P13 as follows. It should be appreciated that P6 (outer-salient-pole width), P7 (inner-salient-pole width) and P13 (outer-magnet width) are the same as those of the first embodiment.

The outer diameter of the outer stator 8 is referred to as outer-stator outer diameter and denoted as P1.

The diameter of each outer slot 8a1 is referred to as an outer-stator inter-slot diameter and denoted as P2. That is, this diameter P2 is a radial distance between the bottoms of two of the outer slots 8a1, which passes through the central axis CL, that is, the center O, of the shaft 4, as shown in FIG. 6.

The number of the outer teeth 8a2 included in one pole of the stator 8 (six in FIG. 6) multiplied by the width of one outer tooth 8a2 (P31, P32, 33, P34, P35 or P36 in FIG. 6) is referred to as outer-stator-tooth width and denoted as P3.

The outer diameter of the rotor 6 is referred to as rotor outer diameter and denoted as P4.

The radial thickness of each outer magnet 10 is referred to as outer-magnet thickness and denoted as P5.

The radial thickness of each inner magnet 9 is referred to as inner-magnet thickness and denoted as P8.

The inner diameter of the rotor 6 is referred to as rotor inner diameter and denoted as P9.

The diameter of each inner slot 7a1 is referred to as an inner slot inner diameter and denoted as P10. That is, this diameter P10 is a radial distance between the bottoms of two of the inner slot 7a1, which passes through the radial center of the inner stator 7 (in other words, the radial center of the outer stator 8), as shown in FIG. 6. The inner and outer stators 7 and 8 are arranged concentrically.

The number of the inner teeth 7a2 included in one pole of the inner stator 7 (six in FIG. 6) multiplied by the width of one inner tooth 7a2 (P111, P112, P113, P114, P115 or P116 in FIG. 6) is referred to as inner-stator-tooth width and denoted as P11.

The inner diameter of the inner stator 7 is referred to as inner-stator inner diameter and denoted as P12.

On the premise that the requirements of Formulas (1) and (2) of the first embodiment are met and that the relationship expressed by Formula (3) of the second embodiment is established, output torque was calculated, with parameters of P1 to P13 being given to the simulation models. FIG. 7 shows output torque resulting from the calculation performed for each of the models.

Based on the results of the simulations, the models were classified into three groups, i.e. Group H1 of generating high torque, Group H2 of generating middle torque and Group L of generating low torque.

FIG. 8 is a table listing design specifications of Groups H1, H2 and L. FIG. 8 corresponds to the following Table 1:

TABLE 1

| Torque characteristics | Superior | |
|---|---|---|
| | Group H1 | Group H2 |
| P1: Outer-stator outer diameter | 1 | |
| P2: Outer-stator inter-slot diameter | 0.936-0.959 | 0.928-0.967 |
| P3: Outer-stator-tooth width (per pole) | 0.0789-0.1016 | 0.0676-0.1128 |
| P4: Rotor outer diameter | 0.868-0.884 | 0.857-0.895 |
| P5: Outer-magnet thickness | 0.0112-0.0188 | 0.0112-0.0207 |
| P6: Outer-salient-pole width | 0.0112-0.0339 | 0.0075-0.0376 |
| P7: Inner-salient-pole width | 0.0319-0.0489 | 0.0263-0.0489 |
| P8: Inner-magnet thickness | 0.0093-0.0170 | 0.0056-0.0170 |
| P9: Rotor inner diameter | 0.706-0.726 | 0.699-0.726 |
| P10: Inner slot inner diameter | 0.616-0.636 | 0.612-0.636 |
| P11: Inner-stator-tooth width (per pole) | 0.0394-0.0734 | 0.0507-0.0734 |
| P12: Inner-stator inner diameter | 0.571-0.587 | 0.563-0.594 |
| P13: Outer-magnet width (per pole) | 0.1315-0.1579 | 0.1278-0.1617 |

In FIG. 8, using P1=266 mm as a reference, the dimensional ranges of P2 to P13 are shown, being divided into Groups H1, H2 and L. In conformity with the rate of increase/decrease of the dimension of P1, the dimensional ranges of P2 to P13 relatively vary. For example, when the dimension of P1 is increased/decreased by 10%, the dimensional ranges of P2 to P13 also increase/decrease by 10%. FIG. 8 schematically shows, in the right column, the dimensional ranges of P2 to P13, being distinguishable between Groups H1, H2 and L.

The motor 1 of the second embodiment is based on a design specification having the dimensions (dimensions of P1 to P13) of the magnetic circuits included in the ranges of Group H2 shown in FIG. 8. More desirably, the motor 1 may be based on a design specification included in the ranges of Group H1 shown in FIG. 8. The design specification included in Group L is disapproved.

FIG. 9 is a table listing the design specification of Model 31 shown in FIG. 7, as an example of a model having dimensions of the magnetic circuits included in the ranges of Group H2. Similarly, FIG. 10 is a table listing the design specification of Model 123 shown in FIG. 7, as an example of a model having dimensions of the magnetic circuits included in the ranges of Group H1.

As described above, when the motor 1 is based on a design specification having dimensions of the magnetic circuits (dimensions of P1 to P13) included in the ranges of Group H2 of FIG. 8, the output torque of the motor is enhanced compared to the model based on a design specification included in the ranges of Group L. More preferably, it is desirable that the motor 1 is based on a design specification included in the ranges of Group H1. In this case, as shown in FIG. 7, the output torque is more increased and accordingly the motor 1 will be reduced in its size and enhanced in its power.

Third Embodiment

Figure 11:
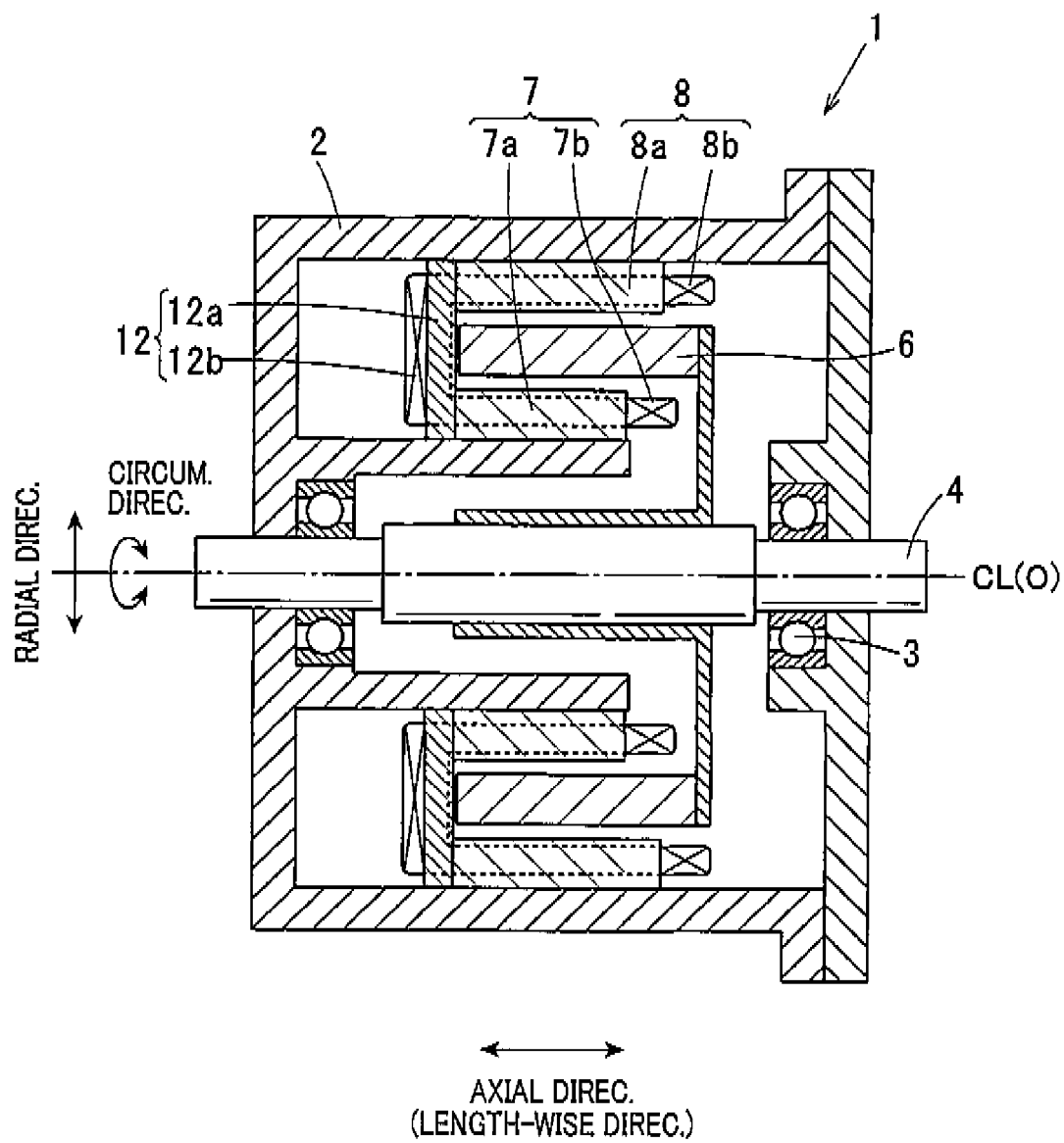
FIG. 11 is a vertical cross-sectional view illustrating a configuration of a motor, according to a third embodiment of the present invention.

The third embodiment deals with an example of a triple-gap type motor 1. FIG. 11 is a vertical cross-sectional view illustrating a triple-gap type motor 1 of the fourth embodiment. As shown in FIG. 11, the triple-gap type motor 1 includes a side stator 12 that faces an end face of the rotor 6, which is axially opposite to the rotor disc (on the left in FIG. 11), with a gap therebetween. The side stator 12 includes a side stator core 12a and a side stator winding 12b. The side stator core 12a is connected to the inner and outer stator cores 7a and 8a. A full-pitch winding of the side stator winding 12b is applied to the side stator core 12a. The side stator winding 12b serially connects between the inner and outer stator windings 7b and 8b.

The triple-gap type motor 1 forms magnetic gaps in three faces between the rotor 6 and the stators 7, 8 and 12. Accordingly, when the requirements of Formulas (1) and (2) of the first embodiment are applied to the magnetic circuits of the rotor 6 of the triple-gap type motor 1, torque can be further enhanced. In addition, when the design specifications described in the second embodiment are applied to the triple-gap type motor 1, the output torque will be enhanced, the size will be reduced, and the power will be increased.

Fourth Embodiment

In the fourth embodiment and subsequent embodiments, like the foregoing, the multi-gap type rotary electric machine of the present invention is applied to a drive motor (hereinafter referred to as motor 51) of a hybrid vehicle.

Although the following embodiments include the similar components described in the foregoing, all the components of those so embodiments are described to clearly provide readers with contexts of their features.

Figure 12:
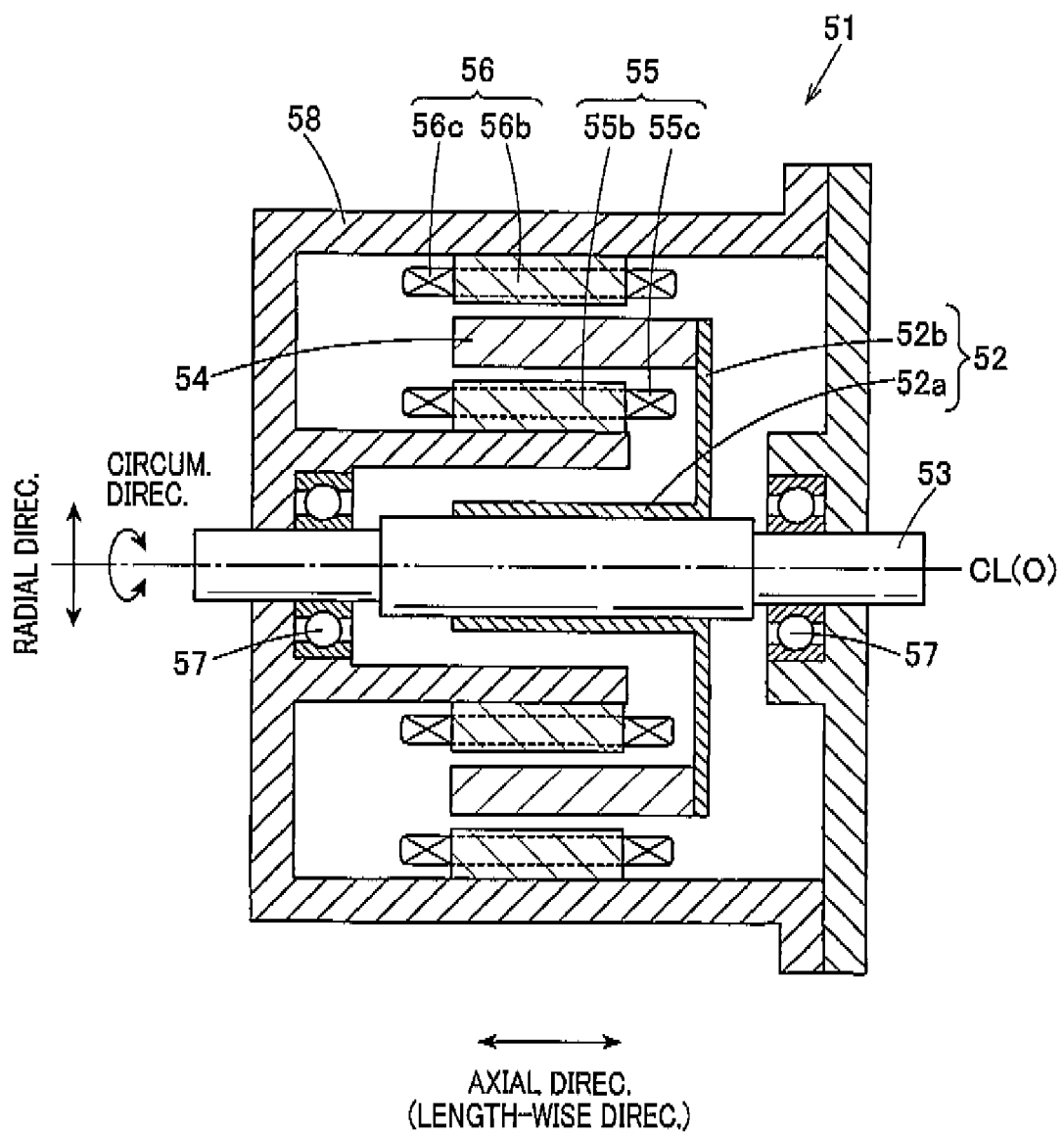
FIG. 12 is a vertical cross-sectional view illustrating a configuration of the motor, according to a fourth embodiment of the present invention.

As shown in FIG. 12, in the same way as the configuration described in the first embodiment, the motor 51 includes an annular rotor 54, an inner stator 55 and an outer stator 56. The rotor 54 is supported by a shaft 53 via a rotor retaining member 52. The inner stator 55 is arranged radially inside of the rotor 54 with a gap therebetween. The outer stator 56 is arranged radially outside of the rotor 54 with a gap therebetween. The basic structure of this motor 51 is the same as that described in the first embodiment.

The shaft 53, which corresponds to a rotary shaft of the present invention, has end portions which are rotatably supported by a motor housing 58 via respective bearings 57.

The rotor retaining member 52 includes a cylindrical boss portion 52a and a disk portion 52b. The cylindrical boss portion 52a is made such as of non-magnetic SUS. The disk portion 52b is extended radially outward from an end of the cylindrical boss portion 52a. The cylindrical boss portion 52a is fitted to the outer periphery of the shaft 53 so that the rotor retaining member 52 is integrally rotated with the shaft 53.

Figure 13:
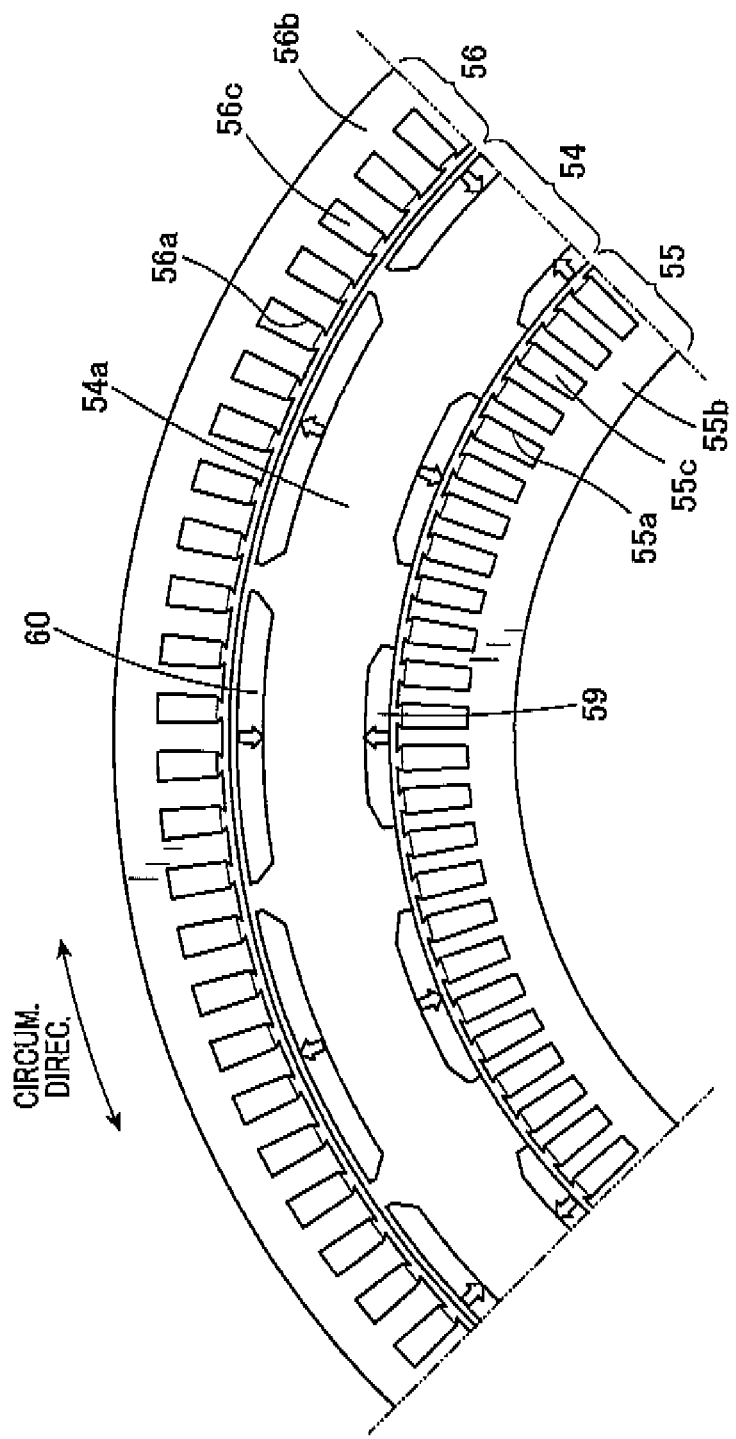

As shown in FIG. 13, the rotor 54 includes a rotor core 54a, inner magnets 59 and outer magnets 60. The inner magnets 59 are embedded in the inner periphery of the rotor core 54a to form inner rotor poles. The outer magnets 60 are embedded in the outer periphery of the rotor core 54a to form outer rotor poles.

For example, the rotor core 54*a* is configured by stacking a plurality of core sheets, each being obtained by annularly punching an electromagnetic steel sheet using a pressing machine. The stacked core sheets are joined together by inserting fastener members, such as rivets or through bolts (not shown), therethrough in the stacked direction, and fixed to the disk portion 52*b* (see FIG. 12).

Figure 14A:
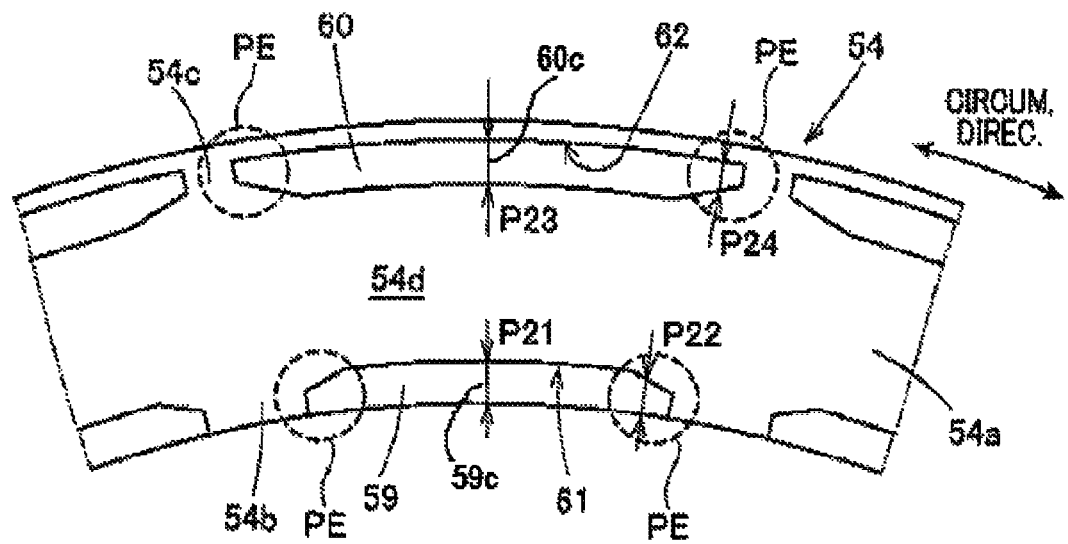
FIGS. 14A and 14B are partial cross-sectional views each illustrating a rotor, according to the fourth embodiment.

As shown in FIG. 14A, the rotor core 54*a* has inner salient poles 54*b*, each of which is formed between circumferentially adjacent inner rotor poles (inner magnets 59). The rotor core 4*a* also has outer salient poles 54*c*, each of which is formed between circumferentially adjacent outer rotor poles (outer magnets 60).

The inner salient poles 54*b* are located at the same circumferential positions as those of the corresponding outer salient poles 54*c*. The rotor core 54*a* includes a rotor yoke 54*d* which is annularly formed and located between the inner rotor poles (inner magnets 59) and the outer rotor poles (outer magnets 60). Inner magnetic flux and outer magnetic flux are joined together and passed through the rotor yoke 54*d*. The inner magnetic flux passes through the rotor core 54*a* via the inner salient poles 54*b* in relation to the inner stator 55. The outer magnetic flux passes through the rotor core 54*a* via the outer salient poles 54*c* in relation to the outer stator 56.

The inner periphery of the rotor core 54*a* is provided with inner magnet insertion holes 61 into which the respective inner magnets 59 are inserted. The outer periphery of the rotor core 54*a* is provided with outer magnet insertion holes 62 into which the respective outer magnets 60 are inserted. However, each of the outer magnet insertion holes 62 is formed in a hole shape, with the outer peripheral side of the rotor core 54*a* being closed. In contrast, each of the inner magnet insertion grooves 61 is formed in a groove shape, with the inner peripheral side of the rotor core 54*a* being open. Specifically, each of the outer magnets 60 is inserted into the corresponding one of the outer magnet insertion holes 62, in a state of being enclosed in the rotor core 54*a*, to form a magnet-embedded structure. On the other hand, each of the inner magnets 59 is inserted into the corresponding one of the inner magnet insertion holes 61, in a state of its inner peripheral surface in the radial direction being exposed, to form a so-called inset structure. In the present invention, the "magnet-embedded structure" is defined to encompass the "inset structure".

As indicated by the arrows in FIG. 13, the inner and outer magnets 59 and 60 are magnetized such that the polarity of each of the inner magnets 59 coincides with that of the corresponding one of the outer magnets 60, the one being radially opposed to the inner magnet 59, and that the orientation of the magnetic field of the inner rotor poles is circumferentially alternated with the orientation of the magnetic field of the outer rotor poles.

As shown in FIG. 13, the inner stator 55 is configured by inner stator core 55*b* and three-phase (U, V and W) inner stator windings 55*c*. In the stator core 55*b*, a plurality of inner slots 55*a* are formed in the circumferential direction at a regular interval. The three-phase inner stator windings 5*c* are wound about the inner stator core 55*b* (e.g., in a full-pitch winding manner).

As shown in FIG. 13, the outer stator 56 is configured by outer stator core 56*b* and three-phase (X, Y and Z) outer stator windings 6*c*. In the stator core 56*b*, a plurality of outer slots 56*a* are formed in the circumferential direction at a regular interval. The three-phase outer stator windings 56*c* are wound about the outer stator core 56*b* (e.g., in a full-pitch winding manner).

The number of slots of the inner stator 55 is the same as that of the outer stator 56.

Figure 15:
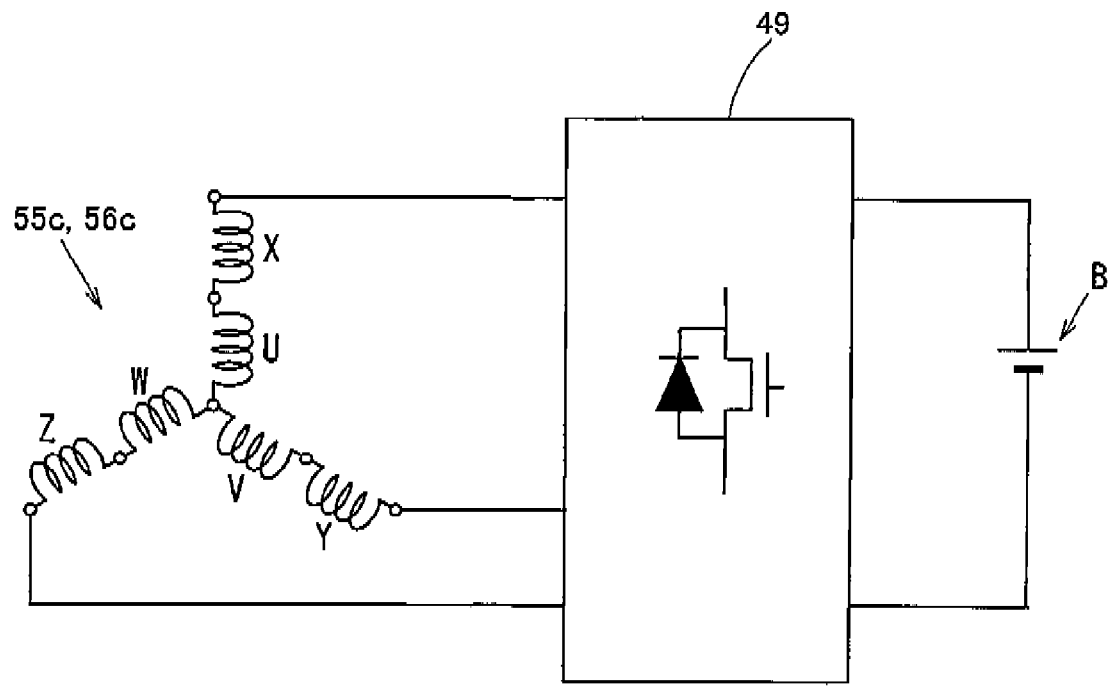
FIG. 15 is a connection diagram illustrating a state where inner and outer stator windings are connected to an inverter.

For example, as shown in FIG. 15, in the same way as the connections described in the first embodiment, the U-, V- and W-phase inner stator windings 55*c* are serially connected to the X-, Y- and Z-phase outer stator windings 56*c*, respectively, to establish a star connection. The star connection has phase terminals on the opposite side of the neutral point, and the phase terminals are connected to an inverter 49. The inverter 49 is controlled by an ECU (electronic control unit), not shown. The control performed by the ECU is based on information derived from a rotor position sensor, not shown, which senses the rotational position of the rotor 54. The inverter 49 converts the electric power of a direct-current power source B into alternating-current electric power and supplies the converted electric power to the inner and outer stator windings 55*c* and 56*c*.

When the inner and outer stator windings 55*c* and 56*c* are excited via the inverter 49, the inner and outer stators 55 and 56 each generate winding magnetomotive force in such a way that the same polarity is created in the magnetic poles that are radially opposed to each other via the rotor 54 at the same circumferential position.

Figure 14B:
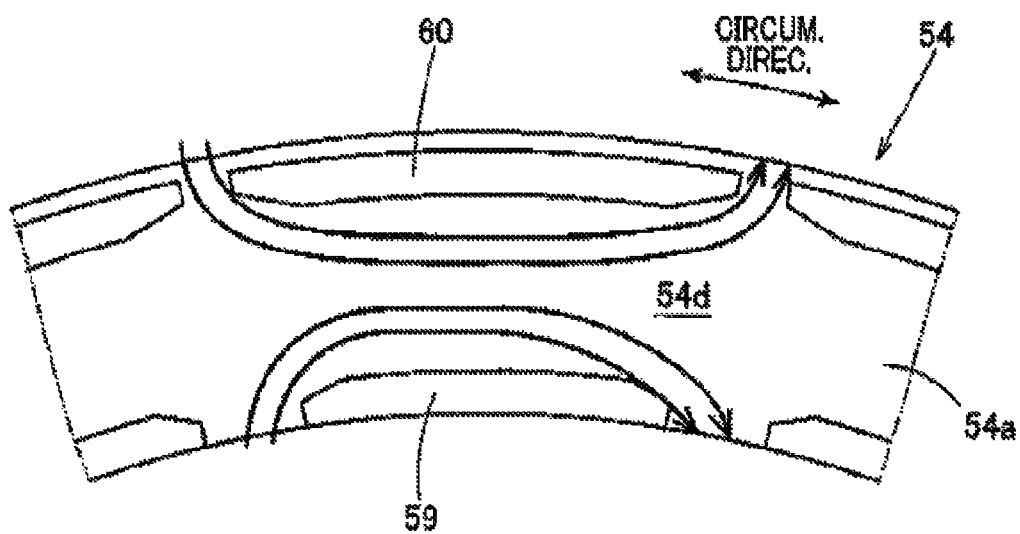

Referring to FIGS. 14A and 14B, hereinafter are described the inner and outer magnets 59 and 60 having features of one subject matter of the present invention. FIGS. 14A and 14B are partial cross-sectional views each illustrating the rotor 54 that includes the inner and outer rotor poles. In FIGS. 14A and 14B, hatching that indicates a cross section is omitted.

First, individual portions of the inner and outer magnets 59 and 60 are defined as follows.

a) A circumferential center portion of each of the inner and outer rotor poles is referred to as pole center portion. Reference P21 indicates the thickness of each inner magnet 59 at the pole center portion, while reference P23 indicates the thickness of each outer magnet 60 at the pole center portion.

b) Circumferential end portions of each of the inner and outer poles are referred to as pole end portions PE. Reference P22 indicates the thickness of each inner magnet 59 at its pole end portions PE. Reference P24 indicates the thickness of each outer magnet 60 at its pole end portions PE.

c) The radially outer peripheral surface of each inner magnet 59 and the radially inner peripheral surface of each outer magnet 60 are each referred to as opposite-to-stator surface.

Each inner magnet 59 and each outer magnet 60 establish relationships P21>P22 and P23>P24, respectively. Further, as shown in FIG. 14A, the opposite-to-stator surface of each magnet is circumferentially inclined toward its circumferential ends with reference to the pole center portion, so that the thickness P21 or P23 is reduced to the thickness P22 or P24, respectively.

Advantages and Effects of the Fourth Embodiment

The motor 1 according to the fourth embodiment uses the rotor 54 having a magnet-embedded structure in which the inner magnets 59 are embedded in the inner periphery of the rotor core 54*a* and the outer magnets 60 are embedded in the outer periphery thereof. Thus, both of magnet torque and reluctance torque are made use of.

Also, in the rotor 54, the opposite-to-stator surface of each of the inner and outer magnets 59 and 60 is inclined in the pole end portions PE of the inner or outer rotor pole. Thus, the thickness P22 or P24 of each magnet is gradually reduced toward the so circumferential ends with reference to the pole center portion. In other words, the radial width of the rotor yoke 54d, in which a magnetic path common to the inner and outer rotor poles is created, is gradually increased (widened) toward the circumferential ends of each inner or outer rotor pole, with reference to the pole center portion. Thus, as indicated by the thick arrows in FIG. 14B, in the rotor yoke 54d, magnetic saturation is minimized in the vicinities of the pole end portions PE which have a highest concentration of q-axis magnetic flux that generates reluctance torque and d-axis magnetic flux that generates magnet torque. As a result, magnetic leakage toward the inner and outer magnets 59 and 60 is prevented. Accordingly, the occurrence of local demagnetization is prevented in the pole end portions PE of each of the inner and outer magnets 59 and 60, without impairing the motor performance.

Hereinafter, the fourth to seventh embodiments of the present invention are described.

In the fifth to seventh embodiments, the components identical with or similar to those in the fourth embodiment are given the same reference numerals for the sake of omitting unnecessary explanation.

Fifth Embodiment

Figure 16A:
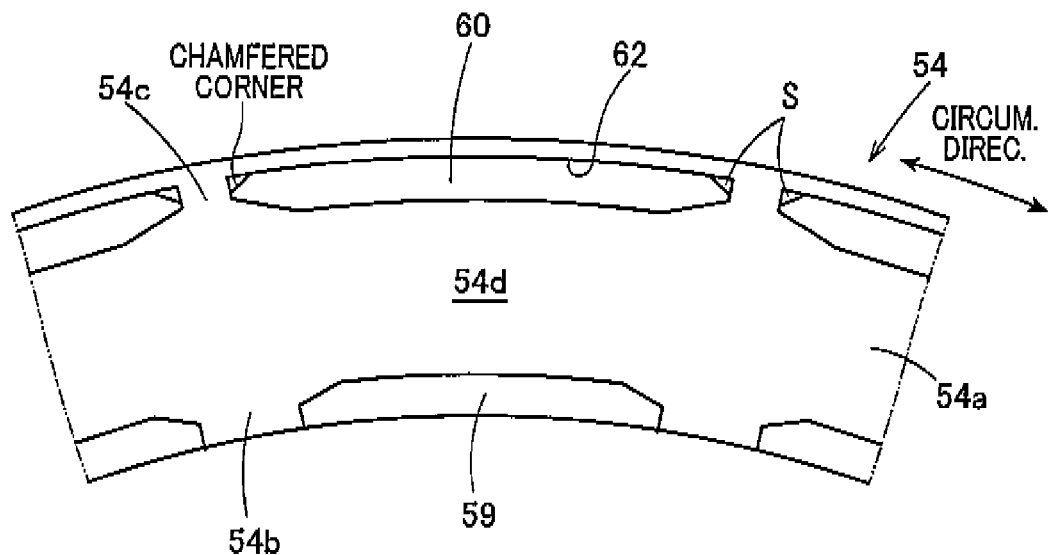
FIGS. 16A and 16B are partial cross-sectional views each illustrating a rotor, according to a fifth embodiment of the present invention.
Figure 16B:
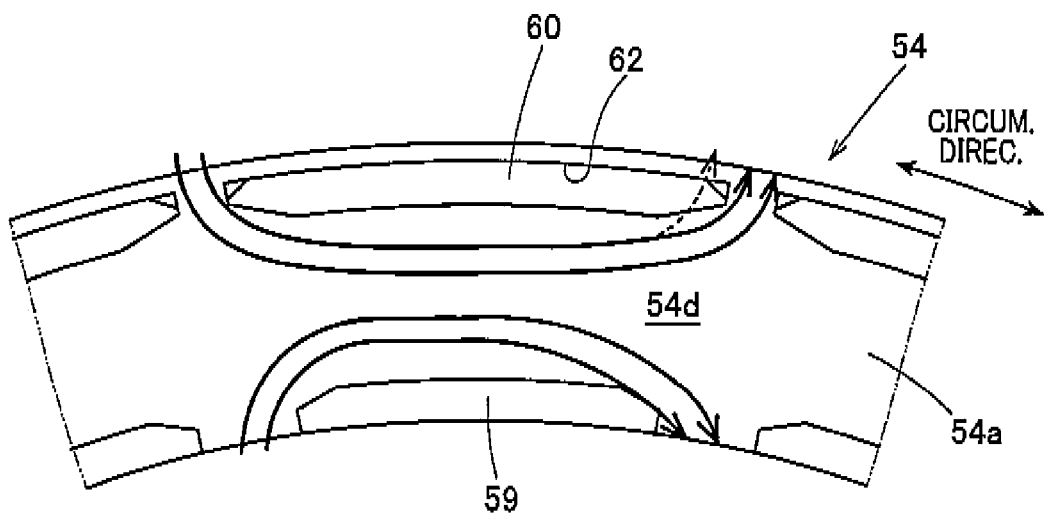

In the fifth embodiment, as shown in FIGS. 16A and 16B, the outer magnet 60 in each outer rotor pole has chamfered corner portions in each of which the stator-side surface of the magnet meets the circumferential end face of the magnet. The stator-side surface of each outer magnet 60 refers to a surface opposite to the opposite-to-stator surface described in the fourth embodiment, i.e. the outer peripheral surface of each outer magnet 60.

Each of the outer magnet insertion holes 62 formed in the rotor core 54a is provided with spaces S which are defined by the inner wall of the hole and the respective chamfered corner portions of the outer magnet 60.

In the configuration of the fifth embodiment, the spaces S of the outer magnet insertion holes 62 function as magnetic gaps. The spaces S are filled with air, by way of example. Therefore, as shown in FIG. 16B, demagnetizing field intensity (the magnetic flux indicated by the broken-line arrow in FIG. 16B) applied to each outer magnet 60 is mitigated. As a result, demagnetization in the pole end portions of the outer magnets 60 is minimized. Alternative to providing the spaces S at the respective chamfered corner portions of the outer magnet 60 in each outer magnet insertion hole 62, as non-magnetic material, such as aluminum or a resin, may be arranged at the spaces corresponding to the spaces S.

Sixth Embodiment

Figure 17A:
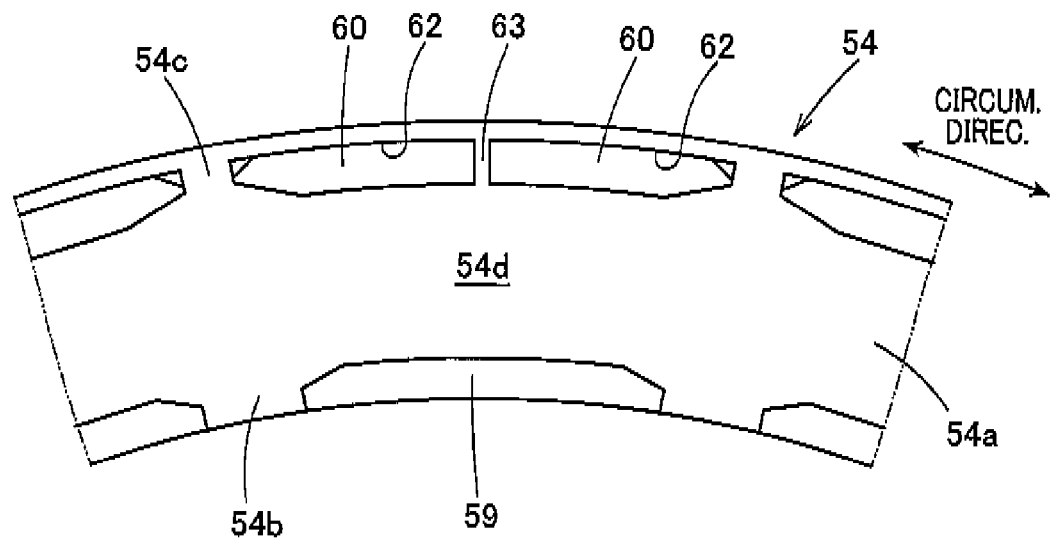
FIGS. 17A and 17B are partial cross-sectional views each illustrating a rotor, according to a sixth embodiment of the present invention.
Figure 17B:
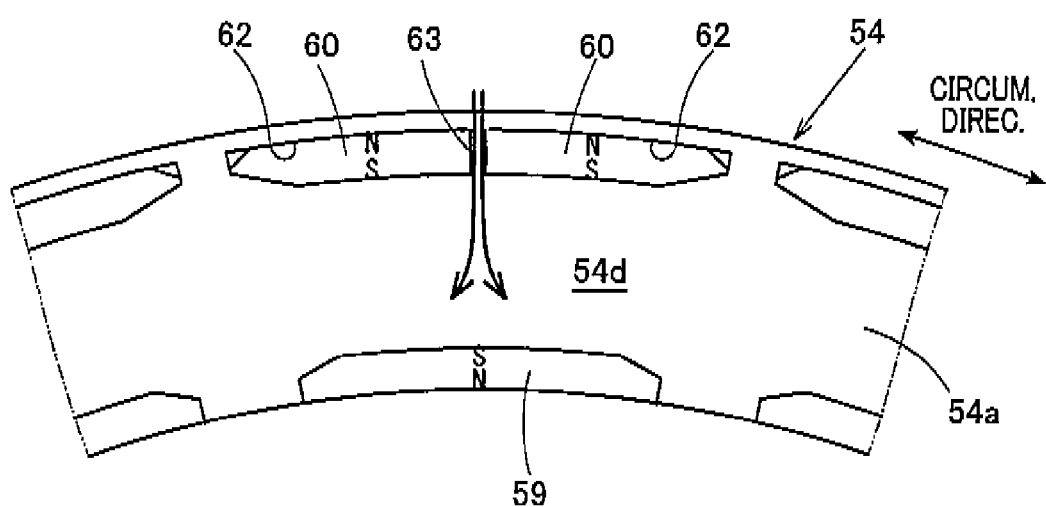

In the sixth embodiment, as shown in FIGS. 17A and 17B, each outer magnet insertion hole 62 includes a bridge 63 that connects between the inner periphery and the outer periphery of the hole 62 to divide the hole 62 into two in the circumferential direction. In this case, the outer magnet 60 that forms each outer rotor pole is divided into two and separately inserted into the two divisions of the outer magnet insertion hole 62 defined by the bridge 63. In other words, each outer rotor pole is formed of a set of two outer magnets 60 that are inserted into the respective two divisions of the outer magnet insertion hole 62 defined by the bridge 63.

As shown in FIG. 17B, in the configuration of the sixth embodiment, the outer magnetic flux passes through the bridge 63 to act against the demagnetizing field applied to the corresponding inner magnet 59. As a result, demagnetization in each inner magnet 59 is mitigated.

Further, formation of the bridges 63 in the rotor core 54a, each of which divides the corresponding one of the outer magnet insertion holes 62, can contribute to enhance the resistance of the rotor 54 against centrifugal force. Specifically, when centrifugal force acts on the outer magnets 60 by the rotation of the rotor 54, each outer magnet 60 is pressed radially outward against a thin portion of the rotor core 54a (radially outer portion of the rotor core 54a with reference to the outer magnet insertion hole 62), the thin portion covering the outer periphery of the outer magnet 60. In this regard, the formation of the bridges 63 can prevent the thin portions from being expanded radially outward, being pressed by the respective outer magnets 60 with the application of the centrifugal force. In this way, the outer periphery of the rotor 54 is prevented from contacting the inner periphery of the outer stator 56. Thus, the magnetic gap between the rotor 54 and the outer stator 56 is uniformly maintained.

Seventh Embodiment

The seventh embodiment is an example of a triple-gap type motor.

Figure 18:
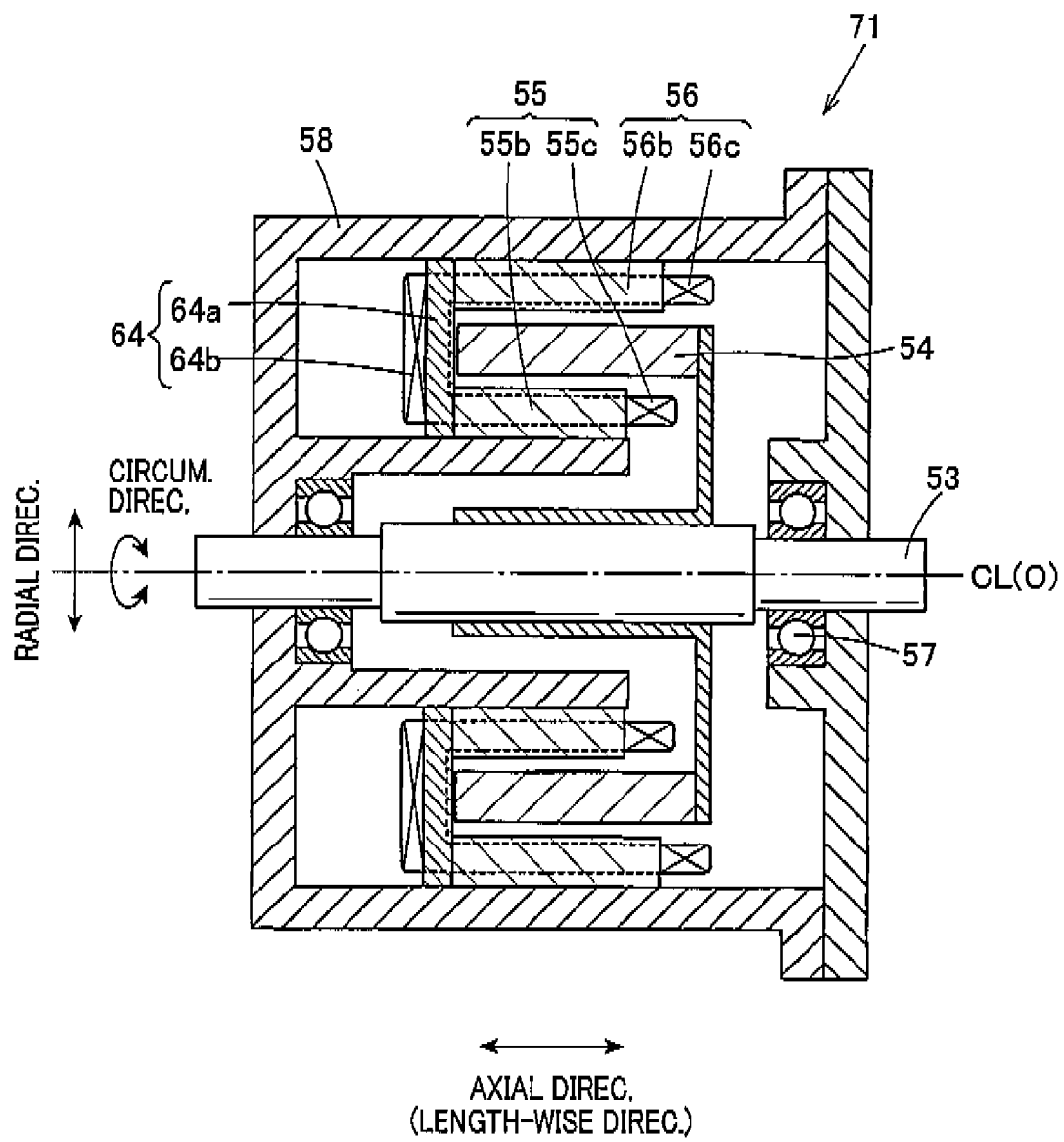
FIG. 18 is a vertical cross-sectional view illustrating a configuration of a motor, according to a seventh embodiment of the present invention.
Figure 19:
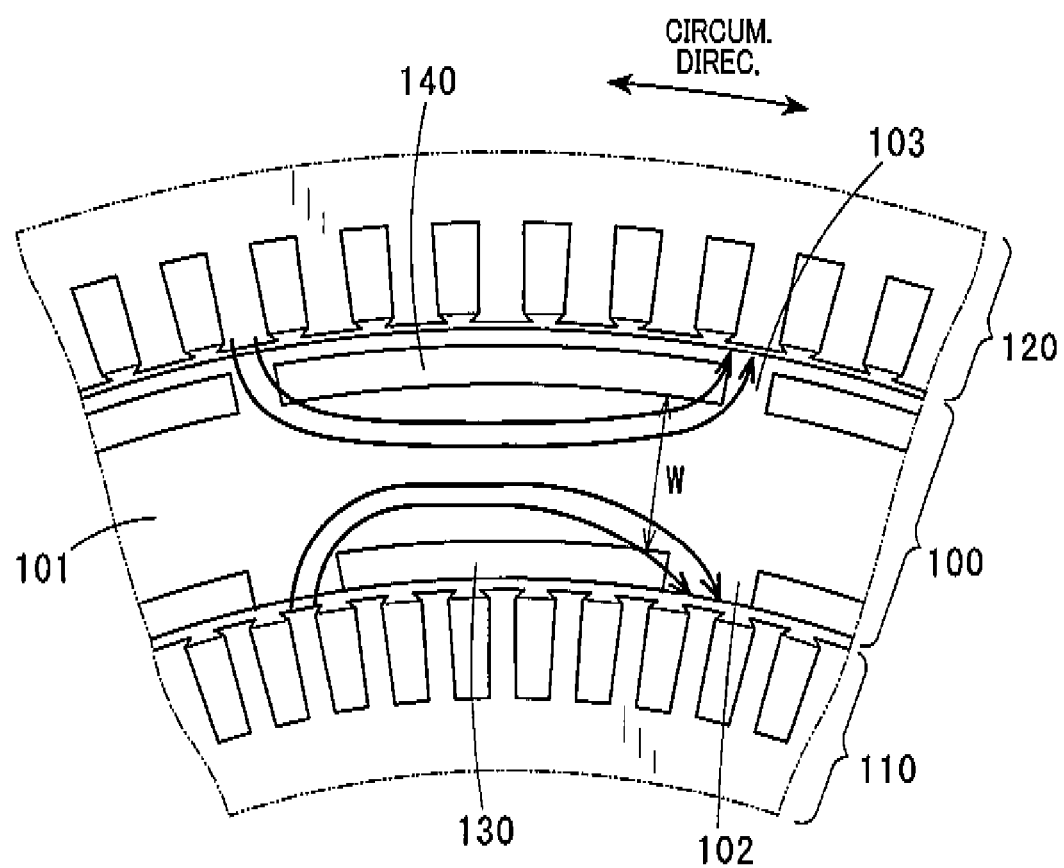
FIG. 19 is a partial cross-sectional view illustrating a magnetic circuit of a motor, according to conventional art.
Figure 20:
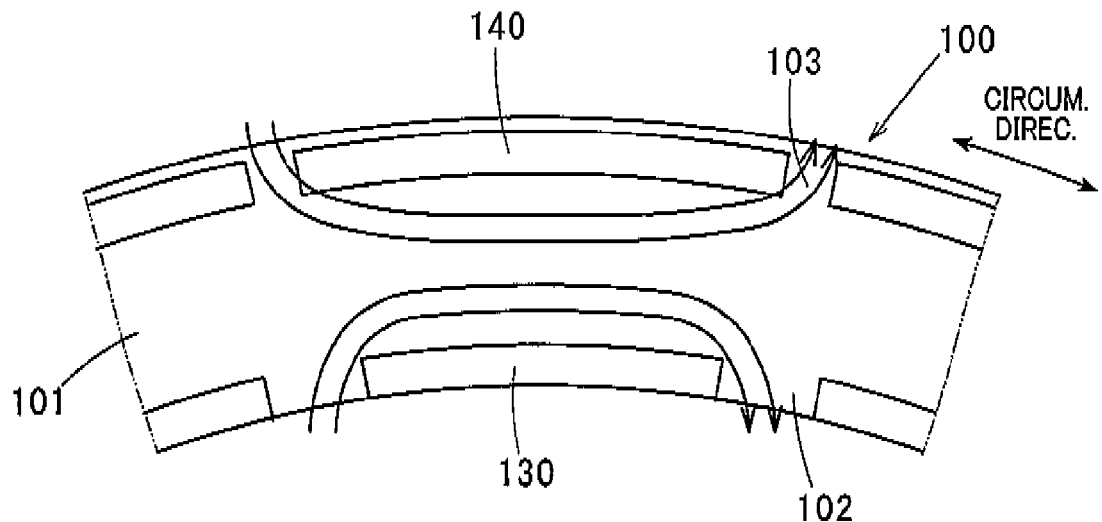
FIG. 20 is a partial cross-sectional view illustrating a rotor to show flow of q-axis magnetic flux, according to conventional art.
Figure 21:
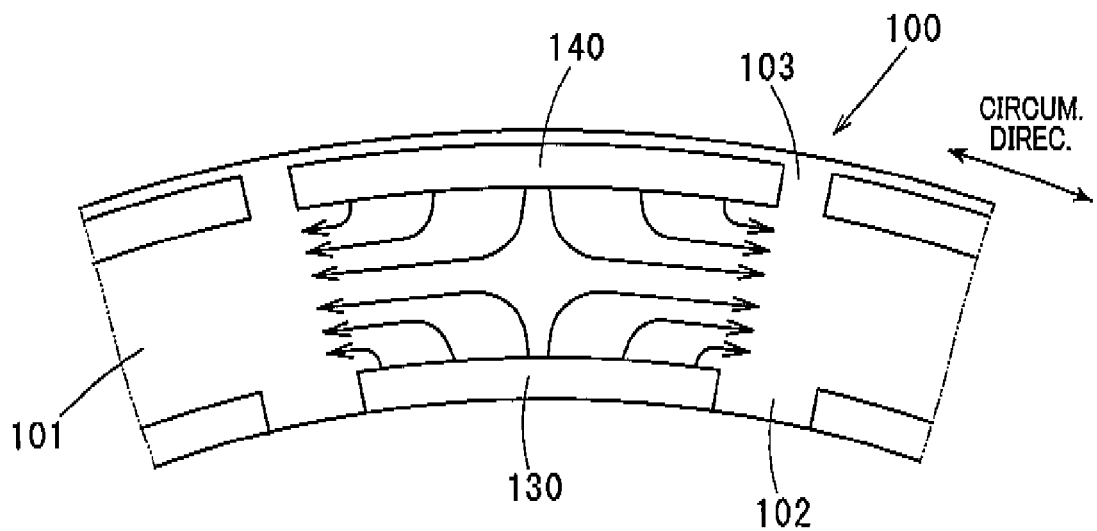
FIG. 21 is a partial cross-sectional view illustrating a rotor to show flow of d-axis magnetic flux, according to conventional art.

As shown in FIG. 18, a triple-gap type motor 71 includes a side stator 64 which faces an end face of the rotor 54 with a gap therebetween, the end face being on a side opposite to the disk portion (left side as viewed in FIG. 18). The side stator 64 includes a side-stator core 64a and a side-stator winding 64b. The side-stator core 64a is connected to the inner and outer stator cores 55b and 56b. The side-stator winding 64b is wound about the side-stator core 64a (e.g., in a full-pitch winding manner) to serially connect the inner and outer stator windings 55c and 56c.

The triple-gap type motor 71 forms magnetic gaps in three faces between the rotor 4 and the stators 55, 56 and 64. Accordingly, by applying the configuration described in any one of the fourth to sixth embodiments, torque can be further enhanced.

Modifications to the Fourth to Seventh Embodiments

In the fourth embodiment, the configuration is applied to both of the inner and outer rotor poles. Specifically, in both of the inner and outer magnets 59 and 60, the opposite-to-stator surface is inclined toward the magnetic pole ends. Alternative to this, the opposite-to-stator surface of either of the inner and outer magnets 59 and 60 may be inclined toward the magnetic pole ends.

In the fifth embodiment, the corner portions of each of the outer magnets 60 are chamfered. Alternative to this, the corner portions of each of the inner magnets 59 may be chamfered, in addition to the chamfering of the outer magnets 60. In this case, similar to the outer rotor poles, spaces are provided to each inner magnet insertion hole 61, the spaces being defined by the inner wall of the hole 61 and the respective chamfered corner portions of the inner magnet 59, or non-magnetic material, such as aluminum or a resin, is arranged in the spaces.

In the sixth embodiment, each outer magnet insertion hole 62 is divided into two by the bridge 63. Alternative to this, each outer magnet insertion hole 62 may be divided using two or more bridges 63.

The present invention may be embodied in several other forms without departing from the spirit thereof. The embodiment and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A multi-gap type rotary electric machine, comprising:
a shaft having a length-wise direction defined as an axial direction, the shaft given both a radial direction and a circumferential direction defined in relation to the axial direction;
an annular rotor securely arranged on the shaft such that the rotor and the shaft rotate together on a center axis of the shaft, the rotor and shaft being concentric to each other;
an inner stator arranged radially inside the rotor with a gap left between the inner stator and the rotor; and
an outer stator arranged radially outside the rotor with a gap left between the outer stator and the rotor;
where in the rotor comprises
an annular rotor core made of soft magnetic material;
inner magnets arranged at radially inner positions in the rotor core, which positions are closer to a radially inner peripery of the rotor core, the inner magnets providing a plurality of inner rotor poles; and
outer magnets arranged at radially outer positions in the rotor core, which positions are closer to a radially outer periphery of the rotor core, the outer magnets providing a plurality of outer rotor poles;
wherein the rotor core comprises
a plurality of inner salient poles each located between mutually adjacent two of the inner rotor poles in the circumferential direction;
a plurality of outer salient poles each located between mutually adjacent two of the outer rotor poles in the circumferential direction; and
a rotor yoke annularly formed and located between the inner rotor poles and the outer rotor poles;
wherein each of the inner and outer rotor poles has two end portions in the circumferential direction;
each of the inner and outer magnets has a thickness in the radial direction;
each of the inner magnets has a radially outer circumferential surface and each of the outer magnets has a radially inner circumferential surface;
the radially outer and inner circumferential surfaces of the end portions of at least ones of the inner and outer magnets have inclinations which gradually reduce the thickness as advancing toward an end of each of the magnet in the circumferential direction while a radial width of the rotor is kept constant, so that a radial width of the rotor yoke is gradually increased toward circumferential ends of each of the inner and outer rotor poles with reference to a circumferential center portion of the corresponding rotor pole;
the inner stator comprises an inner stator core having an axial thickness;
the outer stator comprises an outer stator core having an axial thickness;
the axial thickness of the inner stator core being shorter than the axial thickness of the outer stator core;
each of the outer magnets has a radially outer circumferential surface having a constant distance from a radially outer circumferential surface of the rotor core; and
the radially inner circumferential surfaces of the end portions of the outer magnets having inclinations provide a gradually reduced distance between the radially inner circumferential surfaces of the end portions of the outer magnets and the radially outer circumferential surface of the rotor core.

2. The rotary electric machine of claim 1, wherein the rotor core comprises
a plurality of magnet insertion holes at the radially outer positions, the outer magnets being arranged respectively in the magnet insertion holes, and
one or more bridges each linking radially inner and outer walls of each of the insertion holes with each other such that each of the insertion holes is divided into two or more holes in the circumferential direction,
wherein each of the outer magnets are divided in two or more outer magnets arranged in the divided two or more holes, respectively.

3. The rotary electric machine of claim 1, wherein
each of the inner magnets has a radially inner circumferential surface and each of the outer magnets has a radially outer circumferential surface,
at least ones of the radially inner circumferential surface of the inner magnets and the radially outer circumferential surface of the outer magnets has circumferential ends which are present in end portions, the circumferential ends having chamfered corners on each of which a non-magnetic portion is formed.

4. The rotary electric machine of claim 3, wherein the rotor core comprises
a plurality of magnet insertion holes at the radially outer positions, the outer magnets being arranged respectively in the magnet insertion holes, and
one or more bridges each linking radially inner and outer walls of each of the insertion holes with each other such that each of the insertion holes is divided into two or more holes in the circumferential direction,
wherein each of the outer magnets are divided in two or more outer magnets arranged in the divided two or more holes, respectively.

5. The rotary electric machine of claim 3, wherein the non-magnetic portion is made of air or non-magnetic material.

6. The rotary electric machine of claim 5, wherein the rotor core comprises
a plurality of magnet insertion holes at the radially outer positions, the outer magnets being arranged respectively in the magnet insertion holes, and
one or more bridges each linking radially inner and outer walls of each of the insertion holes with each other such that each of the insertion holes is divided into two or more holes in the circumferential direction,
wherein each of the outer magnets are divided in two or more outer magnets arranged in the divided two or more holes, respectively.

7. A multi-gap type rotary electric machine, comprising:
a shaft having a length-wise direction defined as an axial direction, the shaft given both a radial direction and a circumferential direction defined in relation to the axial direction;
an annular rotor securely arranged on the shaft such that the rotor and the shaft rotate together on a center axis of the shaft, the rotor and shaft being concentric to each other;
an inner stator arranged radially inside the rotor with a gap left between the inner stator and the rotor; and an outer stator arranged radially outside the rotor with a gap left between the outer stator and the rotor;

wherein the rotor comprises an annular rotor core made of soft magnetic material;

inner magnets arranged at radially inner positions in the rotor core, which positions are closer to a radially inner periphery of the rotor core, the inner magnets providing a plurality of inner rotor poles; and outer magnets arranged at radially outer positions in the rotor core, which positions are closer to a radially outer periphery of the rotor core, the outer magnets providing a plurality of outer rotor poles;

wherein the rotor core comprises a plurality of inner salient poles each located between mutually adjacent two of the inner rotor poles in the circumferential direction;

a plurality of outer salient poles each located between mutually adjacent two of the outer rotor poles in the circumferential direction; and a rotor yoke annularly formed and located between the inner rotor poles and the outer rotor poles;

wherein each of the inner and outer rotor poles has two end portions in the circumferential direction;

each of the inner and outer magnets has a thickness in the radial direction;

each of the inner magnets has a radially outer circumferential surface and each of the outer magnets has a radially inner circumferential surface;

the radially outer and inner circumferential surfaces of the end portions of at least ones of the inner and outer magnets have inclinations which gradually reduce the thickness as advancing toward an end of each of the magnet in the circumferential direction while a radial width of the rotor is kept constant, so that a radial width of the rotor yoke is gradually increased toward circumferential ends of each of the inner and outer rotor poles with reference to a circumferential center portion of the corresponding rotor pole, the inner stator comprises an inner stator core having an axial thickness;

the outer stator comprises an outer stator core having an axial thickness;

the axial thickness of the inner stator core being shorter than the axial thickness of the outer stator core;

each of the inner magnets has a radially inner circumferential surface entirely extending along a radially inner circumferential surface of the rotor core; and the radially outer circumferential surfaces of the end portions of the inner magnets having inclinations provide a gradually reduced distance between the radially outer circumferential surfaces of the end portions of the inner magnets and the radially inner circumferential surface of the rotor core.

8. The rotary electric machine of claim 7, wherein the rotor core comprises a plurality of magnet insertion holes at the radially outer positions, the outer magnets being arranged respectively in the magnet insertion holes, and one or more bridges each linking radially inner and outer walls of each of the insertion holes with each other such that each of the insertion holes is divided into two or more holes in the circumferential direction, wherein each of the outer magnets are divided in two or more outer magnets arranged in the divided two or more holes, respectively.

9. The rotary electric machine of claim 7, wherein each of the inner magnets has a radially inner circumferential surface and each of the outer magnets has a radially outer circumferential surface, at least ones of the radially inner circumferential surface of the inner magnets and the radially outer circumferential surface of the outer magnets has circumferential ends which are present in end portions, the circumferential ends having chamfered corners on each of which a non-magnetic portion is formed.

10. The rotary electric machine of claim 9, wherein the rotor core comprises a plurality of magnet insertion holes at the radially outer positions, the outer magnets being arranged respectively in the magnet insertion holes, and one or more bridges each linking radially inner and outer walls of each of the insertion holes with each other such that each of the insertion holes is divided into two or more holes in the circumferential direction, wherein each of the outer magnets are divided in two or more outer magnets arranged in the divided two or more holes, respectively.

11. The rotary electric machine of claim 9, wherein the non-magnetic portion is made of air or non-magnetic material.

12. The rotary electric machine of claim 11, wherein the rotor core comprises a plurality of magnet insertion holes at the radially outer positions, the outer magnets being arranged respectively in the magnet insertion holes, and one or more bridges each linking radially inner and outer walls of each of the insertion holes with each other such that each of the insertion holes is divided into two or more holes in the circumferential direction, wherein each of the outer magnets are divided in two or more outer magnets arranged in the divided two or more holes, respectively.

* * * * *